Aug. 15, 1972   N. F. DIBBLE   3,684,681
HANDLING APPARATUS FOR PLATING ARTICLES
Filed July 10, 1969   13 Sheets-Sheet 1
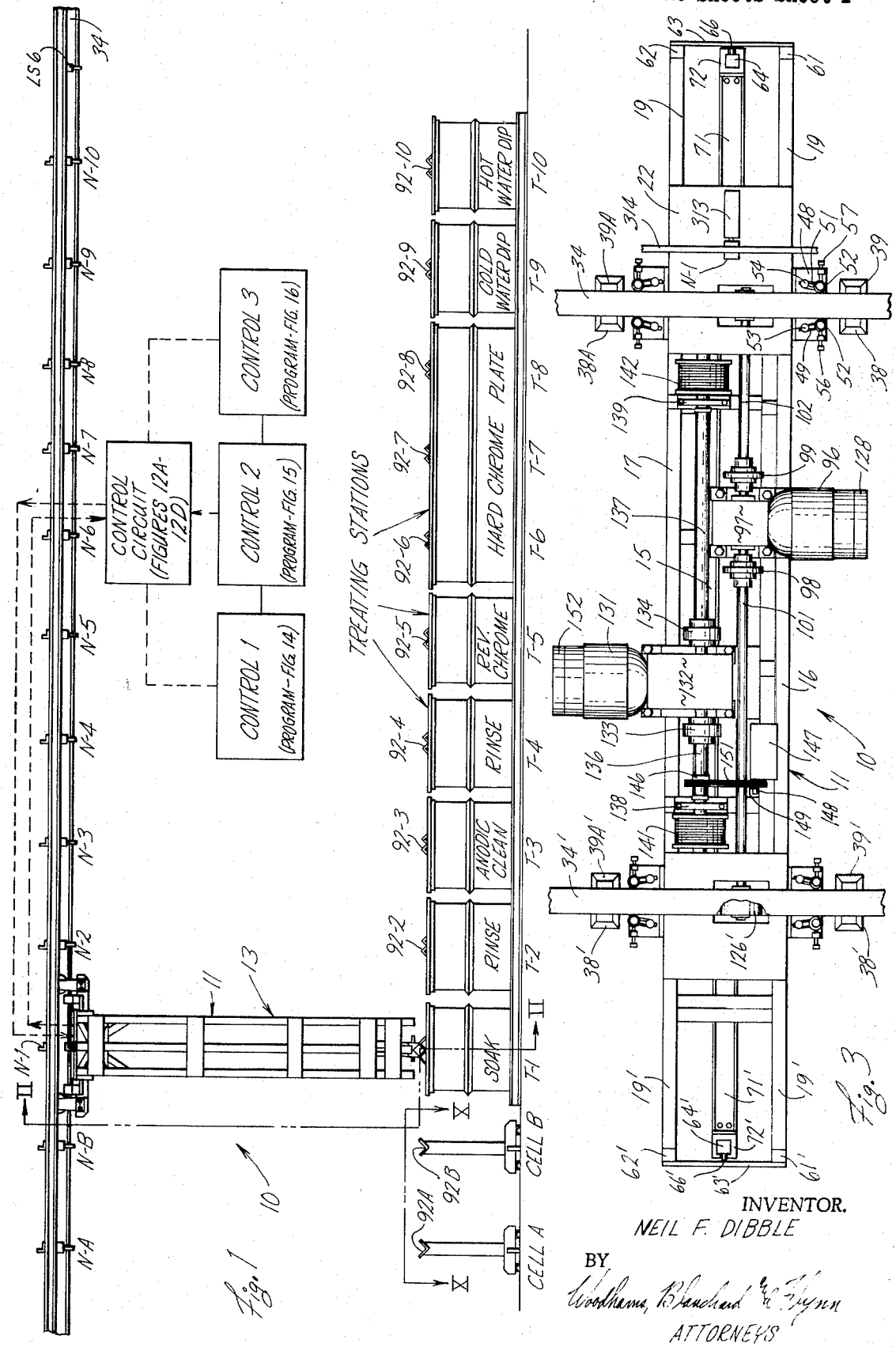
INVENTOR.
NEIL F. DIBBLE
BY
Woodhams, Blanchard & Flynn
ATTORNEYS

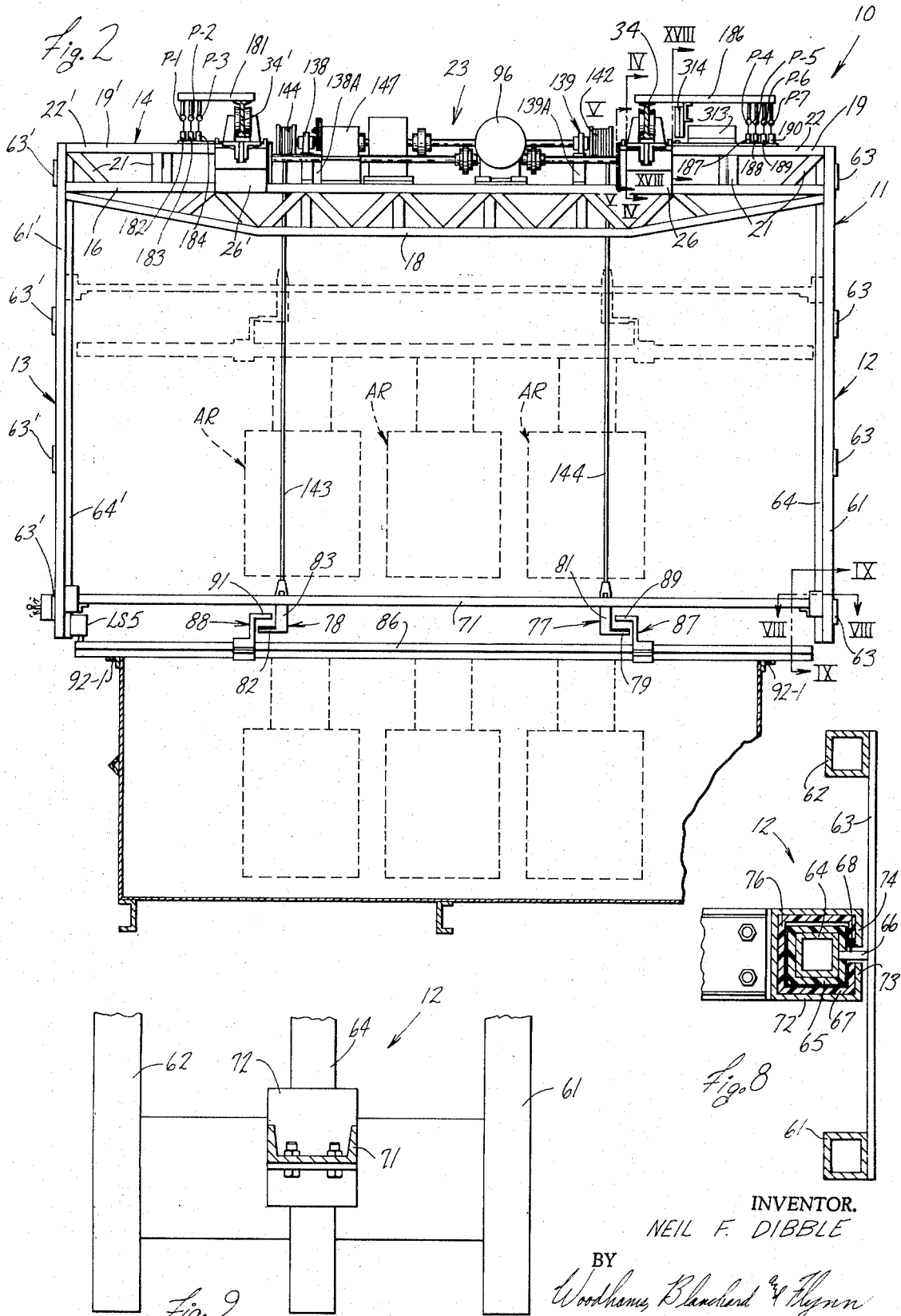

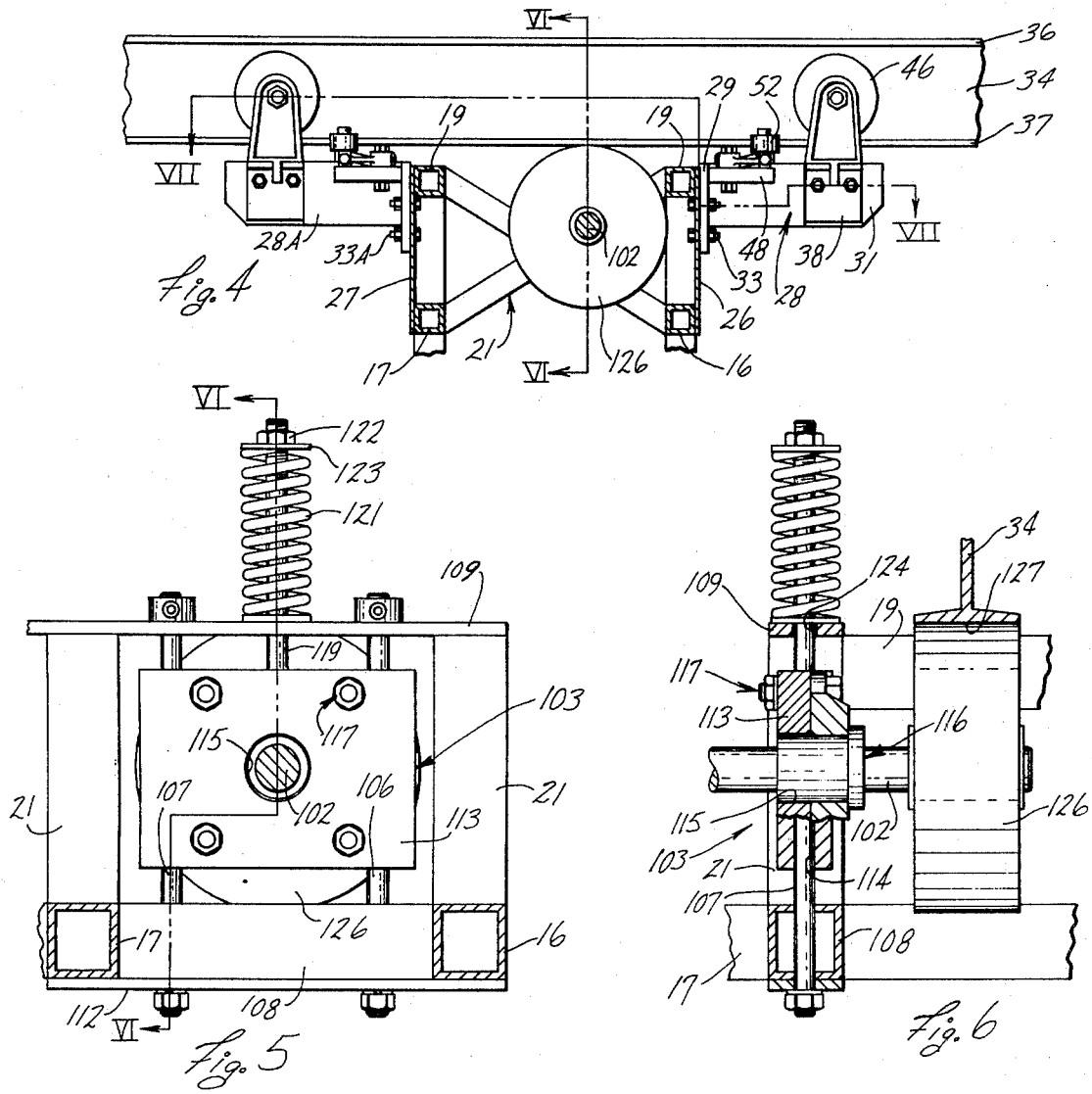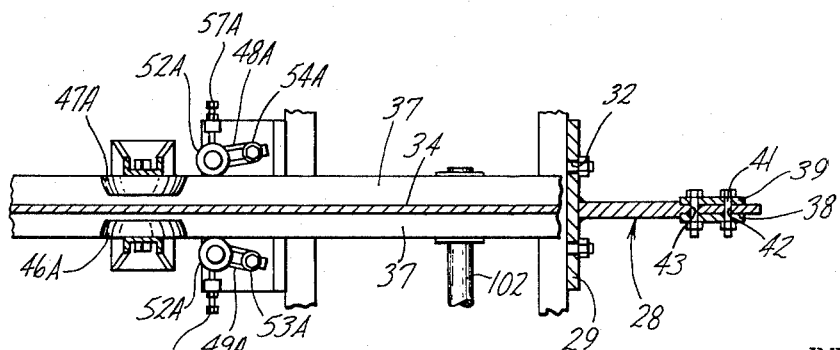

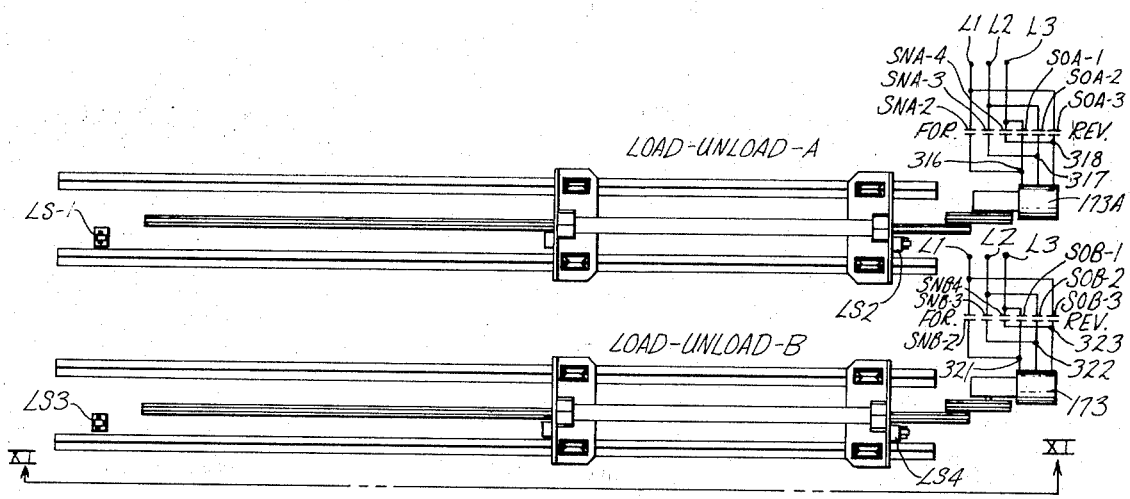
Fig. 10
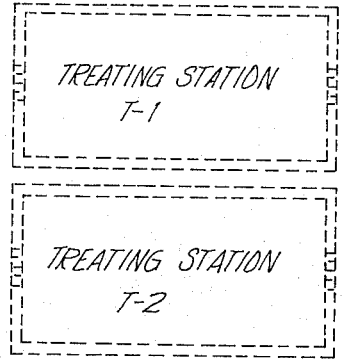
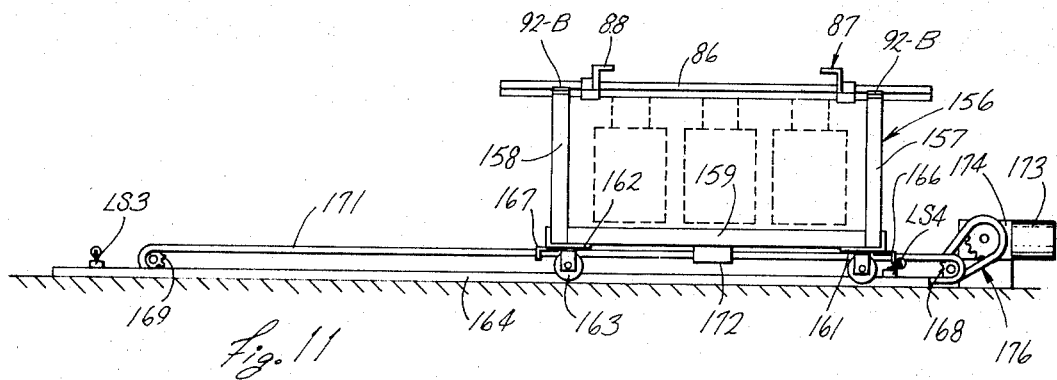
Fig. 11
INVENTOR.
NEIL F. DIBBLE
BY
*Woodhams, Blanchard & Flynn*
ATTORNEYS

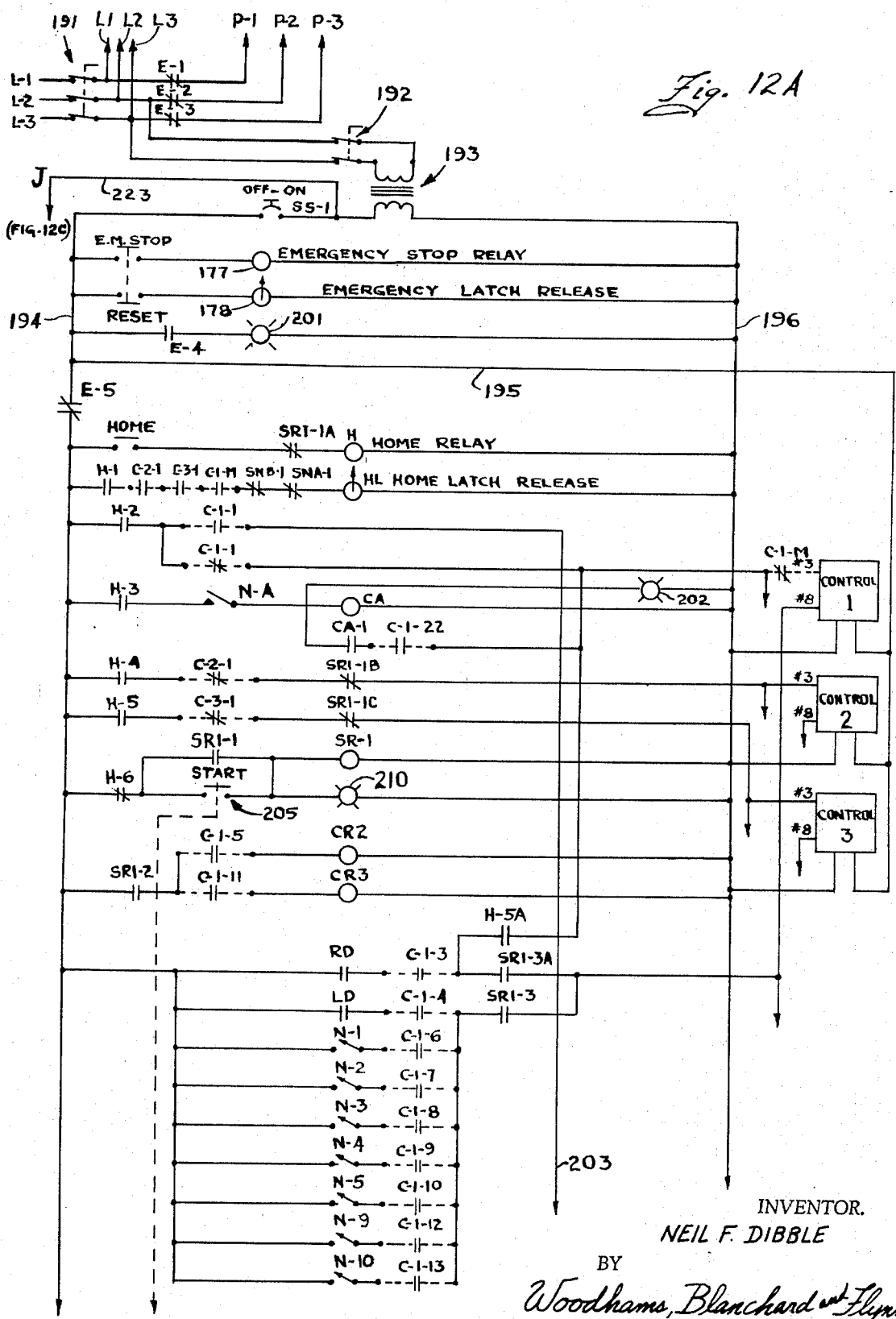

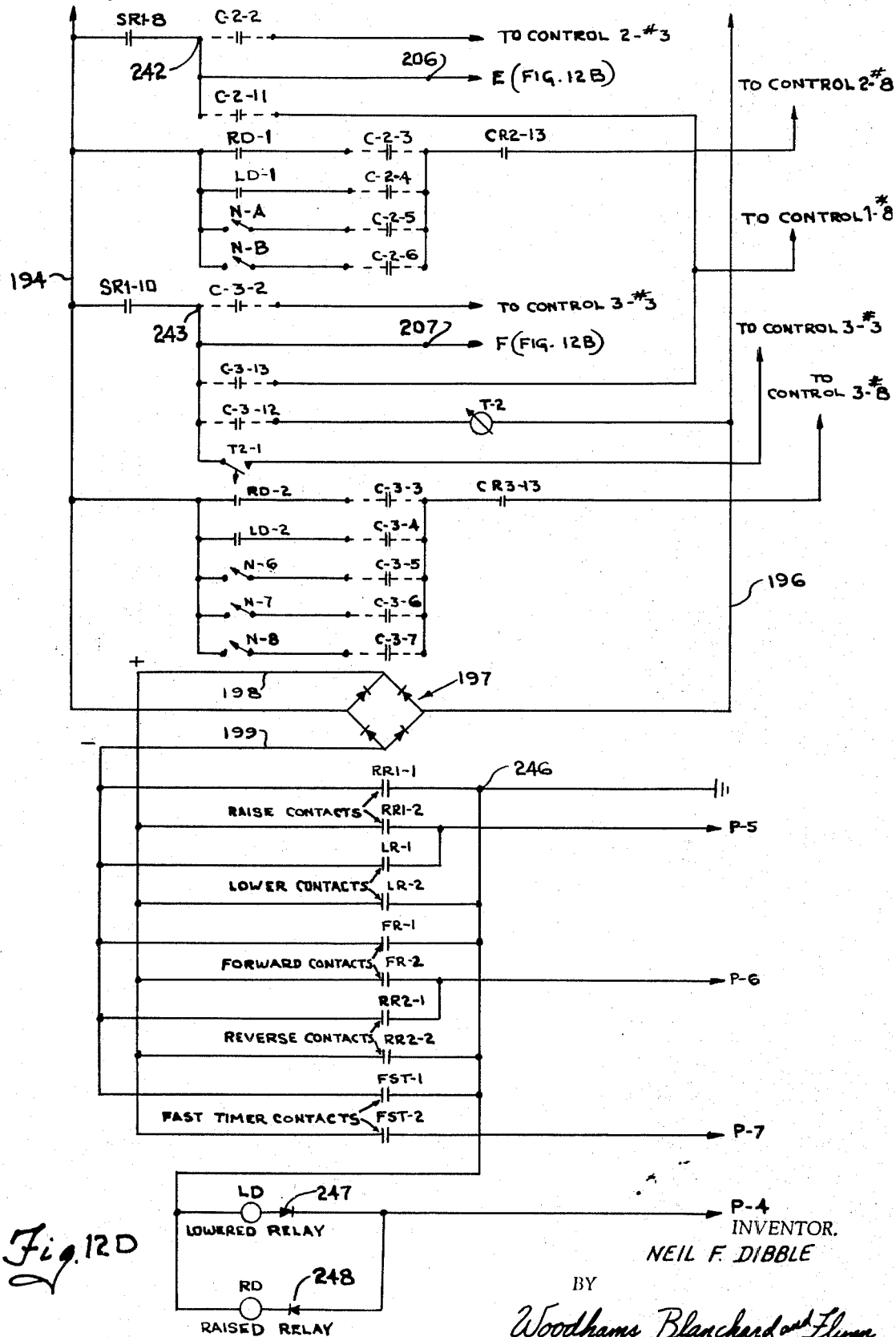

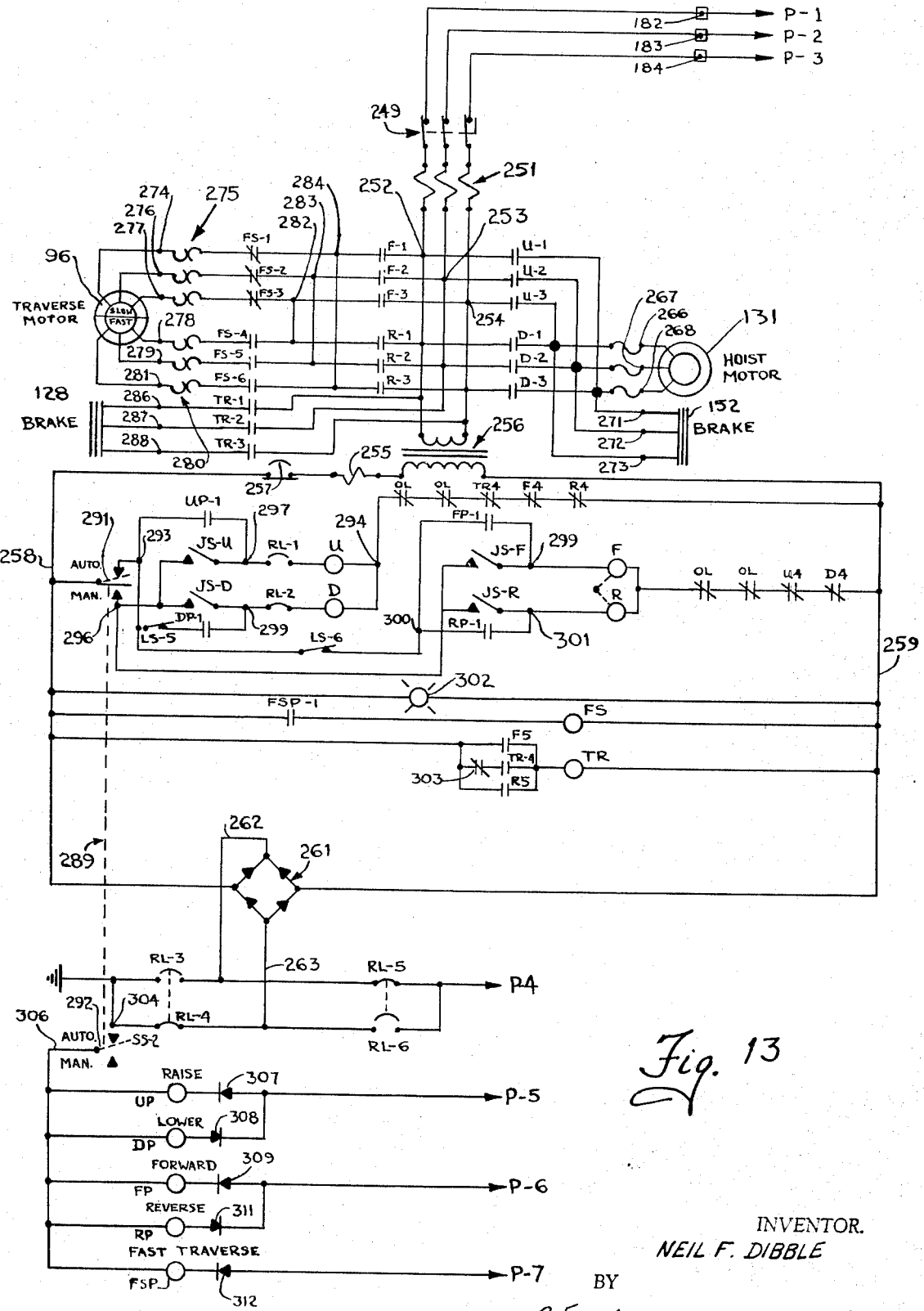

Fig. 16 CONTROL 3

Fig. 15 CONTROL 2

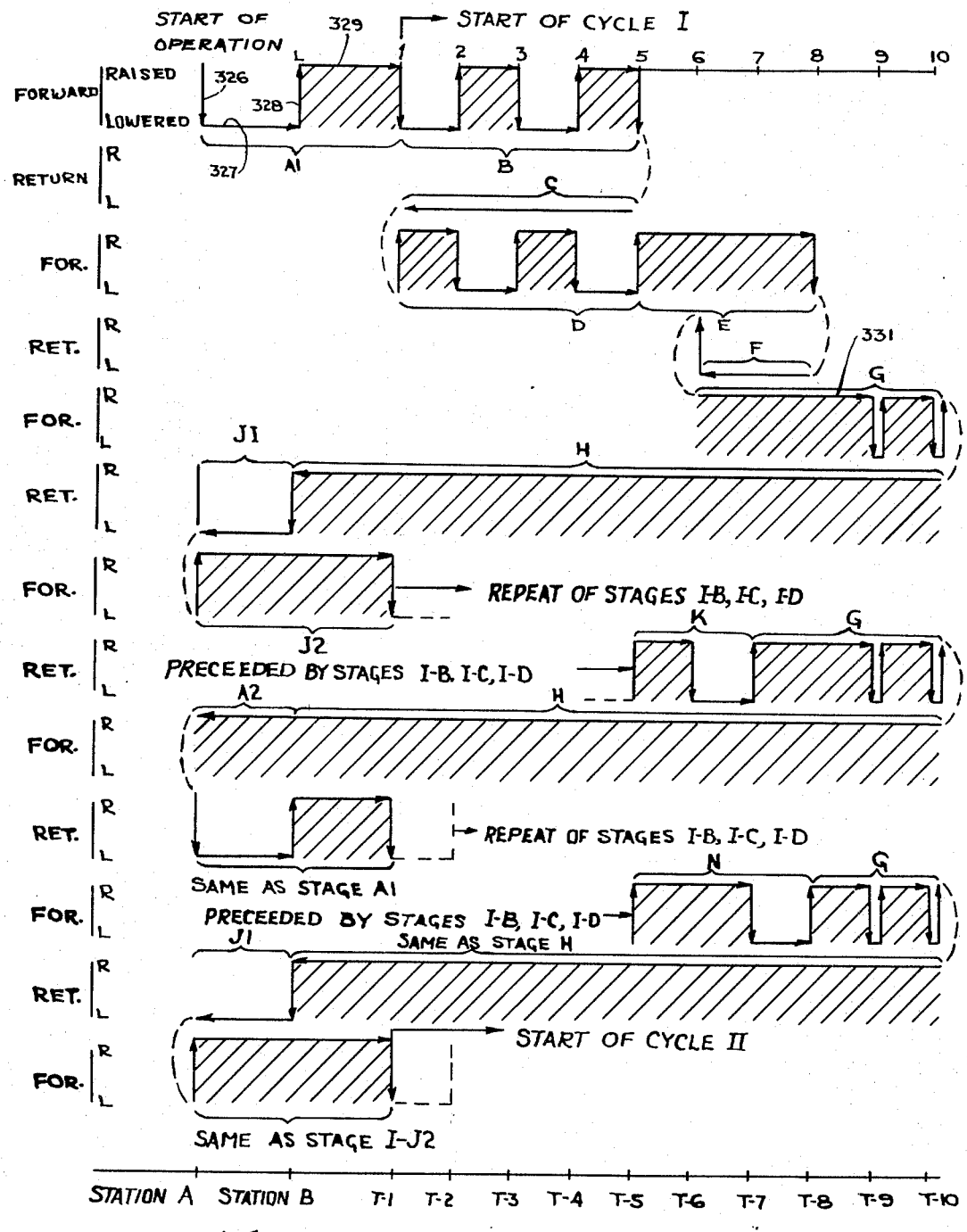

Aug. 15, 1972     N. F. DIBBLE     3,684,681

HANDLING APPARATUS FOR PLATING ARTICLES

Filed July 10, 1969     13 Sheets-Sheet 13

INVENTOR.
NEIL F. DIBBLE
BY
Woodhams, Blanchard & Flynn
ATTORNEYS

United States Patent Office 3,684,681
Patented Aug. 15, 1972

3,684,681
HANDLING APPARATUS FOR
PLATING ARTICLES
Neil F. Dibble, 2262 Greenview Drive,
Wyoming, Mich. 49509
Filed July 10, 1969, Ser. No. 840,783
Int. Cl. B08b 3/00
U.S. Cl. 204—198
8 Claims

ABSTRACT OF THE DISCLOSURE

A plating apparatus having a carriage mounted for movement on rails extending along a series of aligned stations and drive means for moving the carriage. Power operated lift means is mounted on the carriage, and control means automatically coordinates the operation of the drive means and the lift means in a preselected pattern. Programming means is connected to said control means and actuates the drive means and the power lift means by means of D.C. signals.

FIELD OF THE INVENTION

This invention relates in general to an apparatus for moving articles and to an apparatus using a D.C. potential to control the operation of the drive means and the power means by which the movement of the articles is effected. More particularly, the invention relates to a method and apparatus for moving plural articles simultaneously through a series of identical steps in performing a plating operation.

BACKGROUND OF THE INVENTION

It is old in the art to use an apparatus including a conveyor for moving plural articles or workpieces through a plurality of treating stations wherein the conveyor is automatically controlled for sequentially moving the articles with respect to the treating stations. Examples of such structures are illustrated in U.S. Pats. Nos. 3,252,603 and 3,338,437. However, these structures include two or more conveying devices and complicated systems of loose wires connecting the controls with the conveying devices. Moreover, their specific performances are unnecessarily time consuming.

Accordingly, it is an object of this invention to provide an apparatus which utilizes a single conveyor programmed for sequential movements whereby a plurality of workpieces can be treated simultaneously and sequentially at a plurality of stations, even though the time required for a workpiece to be treated is different in each station.

It is a further object of this invention to provide an apparatus, as aforesaid, wherein the treatment of the workpieces is completed within a minimum of time, and whereby all of the treating stations are substantially constantly in use during the normal operation of the apparatus.

It is a further object of this invention to provide a simplified means including D.C. potential for supplying command signals to the carriage drive means of the conveyor and to the power operated lift means on the carriage.

It is a further object of this invention to provide an apparatus, as aforesaid, which is of a simplified construction, which is easy to maintain and which utilizes readily available component parts.

Other objects and purposes of this invention will be apparent to persons acquainted with apparatus of this general type upon reading the following specification and inspecting the accompanying drawings, in which:

FIG. 1 is a side elevational view of an apparatus which embodies the invention and comprises a single carriage movable along rails positioned above a series of treating stations;

FIG. 2 is a sectional view taken along the line II—II in FIG. 1;

FIG. 3 is a top plan view of the carriage;

FIG. 4 is a sectional view taken along the line IV—IV in FIG. 2;

FIG. 5 is a sectional view taken along the line V—V in FIG. 2;

FIG. 6 is a sectional view taken along the line VI—VI in FIGS. 4 and 5;

FIG. 7 is a sectional view taken along the line VII—VII in FIG. 4;

FIG. 8 is a sectional view taken along the line VIII—VIII in FIG. 2;

FIG. 9 is a sectional view taken along the line IX—IX in FIG. 2;

FIG. 10 is a top plan view of the shuttles taken along the line X—X in FIG. 1;

FIG. 11 is a side elevational view of the shuttle shown in FIG. 10;

FIGS. 12A–12D are electric schematical illustrations of the electrical components which control the movement of the carriage;

FIG. 13 is a schematical illustration of the electrical components on the carriage;

FIG. 15 is a program for control No. 2;

FIG. 16 is a program for control No. 3;

FIG. 17 is a diagrammatical illustration of the movements of the lift on the carriage as it moves from treating station to treating station;

Figure 12B:
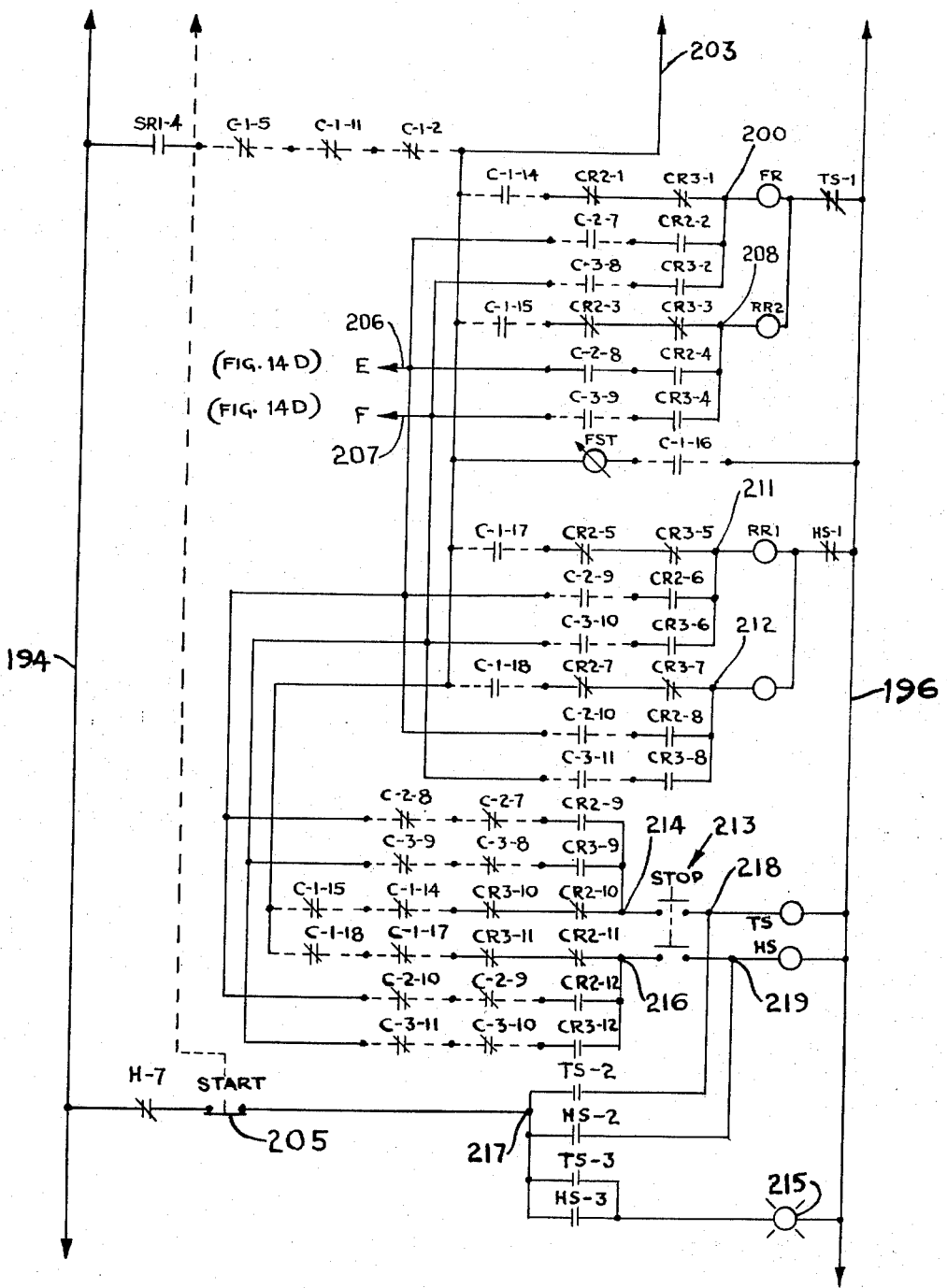

For convenience in description, the words "up," "down," "right" and "left" will designate directions in the drawings to which reference is made. The words "front" and "rear" will refer to the left and right ends, respectively, of the apparatus and its parts as appearing in FIG. 1. The words "in" and "out" will refer to directions toward and away from, respectively, the geometric center of the apparatus and designated parts thereof. Such terminology will include derivatives and words of similar import.

SUMMARY OF THE INVENTION

The objects and purposes of this invention, including those set forth above, are met by providing an apparatus including a carriage mounted on rails extending along a series of treating stations, the carriage including reversible drive means for moving the carriage along said rails and power lift means for moving workpieces with respect to the stations. Control means automatically coordinates the operation of the drive means and the power lift means in a preselected pattern. The control means, which includes programming means, is connected by a plurality of signal carrying lines which transmit D.C. signals to the carriage. The D.C. potential generating means provides positive and negative potentials which are selectively supplied to effect appropriate operation of the drive means and the power lift means. The control means is also responsive to positive and negative signals initiated at the carriage to effect further operations of the drive means and the power lift means.

DETAILED DESCRIPTION

FIG. 1 illustrates an apparatus including a carriage 10 mounted for horizontal, straight line movement along and above a plurality of tanks or treating stations. The workpieces are picked up by, or discharged from, the carriage 10 at the stations A and B. Between pick up and discharge, the workpieces are moved from one station to another by the carriage 10 in a manner described in detail hereinafter. In this particular embodiment, there are ten treating stations numbered T–1 through T–10 which can provide articles A with a surface coating of hard chrome. It is recognized that the number of treating stations and carriages can be varied and the type of surface treatment can be changed without departing from the scope of this invention. However, for ease of disclosure, the following description will be limited to a system which utilizes ten treating stations, as illustrated in FIG. 1.

CARRIAGE FRAME (FIGS. 1–9)

The carriage 10 comprises a frame 11 which is generally U-shaped as viewed from the front or rear ends of the apparatus. The frame 11 comprises a pair of parallel depending legs 12 and 13 (FIG. 2) and a cross member 14 interconnecting the upper ends of the legs 12 and 13.

In this particular embodiment, the cross member 14 is comprised of a plurality of elongated and tubular members of rectangular cross section which extend between the parallel legs 12 and 13. The upper parallel tubular members 16 and 17 define a mounting surface which is reinforced by trussed side frames 18.

The end portions of the cross member 14 are mirror images of each other. Therefore, and in order to simplify the discussion, the parts of the right end portion (FIG. 2) of the cross member will be identified by reference numbers and the corresponding parts on the left end portion will be identified by the prime of the same reference numbers.

A plurality of elongated tubular members 19 of rectangular cross section are supported above the end portions 18 by brace members 21 (FIG. 2) and the upper surfaces thereof define mounting surfaces parallel with and spaced above the surface of members 16 and 17. In this particular embodiment, the members 19 and 19' extend inwardly from the ends of the frame 11 toward the center of the cross member 14 but are spaced from each other. A pair of mounting plates 26 and 27 (FIGS. 2 and 4) are secured, as by welding, to the forward and rearward sides, respectively, of the cross member 14 and extend between the members 19 and 16 or 17.

A T-shaped bracket 28 (FIG. 7) having a cross member 29 and a stem 31 is secured to the plate 26. In this particular embodiment, the cross member 29 is provided with a plurality of holes 32 which are aligned with corresponding holes in the plate 26 to receive bolts 33 for securing the cross member 29 to the plate 26. The stem 31 of the bracket 28 extends perpendicularly rearwardly of the plate 26 so that it can be suspended below an elongated rail 34 which supports one side of the carriage 10, as illustrated in FIG. 1. The rail 34 is an I-beam having an upper pair of sidewardly extending flanges 36 and a lower pair of sidewardly extending flanges 37.

A pair of holes are provided through the outer free end of the stem 31, and a pair of wheel mounting brackets 38 and 39 are positioned on opposite sides of the stem 31 and have a pair of holes aligned with the holes in the stem 31 to receive bolts 41 for securing the wheel mounting brackets 38 and 39 to the stem 31. Wheels 46 and 47 are rotatably held by the wheel mounting brackets 38 and 39, respectively, and said wheels are supported by the flanges 37 of the rail 34, between the flanges 36 and 37. Thus, if a wheel becomes damaged or worn and in need of replacement, it can be released from the carriage 10 by removing the bolts 33 and/or 41. Further, the wheels 46 and 47 can be removed, one at a time, from the bracket 28 without providing additional support for the carriage 10 during such removal. Thus, the time that the machine is down for repair is minimized due to the ease with which maintenance can be performed on the carriage supporting structure.

Parts of the T-shaped bracket 28A will be referred to by the same reference numerals designating corresponding parts of the bracket 28 but with the suffix "A" added thereto. The cross member 29A of the T-shaped bracket 28A (FIG. 4) is secured to the plate 27 by a plurality of bolts 33A.

A horizontal plate 48 is secured to the upper edge of the cross member 29 and the steam 31 of the bracket 28. A pair of brackets 49 and 51 (FIG. 3) are pivotally secured to the upper surface of the plate 48 adjacent the outer edges of the flanges 37 of the rail 34 by bolts 53 and 54, respectively. Rollers 52 are secured to the free ends of the brackets 49 and 51 and engage the outer edges of the flanges 37 of the rail 34. Adjustment mechanisms 56 and 57 engage the brackets 49 and 51, respectively, adjacent their free ends to hold the rollers 52 close to but not touching the flanges 37 on the rail 34. This construction will prevent the carriage from becoming skewed relative to the rails 34 and 34'.

The left side of the cross member 14 (FIG. 2) is supported from a rail 34' by an identical set of T-shaped brackets 28' and 28A' illustrated in FIG. 3 so that the cross member 14 of the carriage 10 is supported for movement along the rails 34 and 34' by the sets of wheels 46, 47, 46A, 47A and 46', 47', 46A', 47A'. The rollers 52, 52A and 52' and 52A' engaging the outer edges of the flanges 37 and 37' of the rails 34 and 34' oppose a transverse displacement of the cross member 14 relative to the rails 34 and 34'.

The leg 12 of the frame 11 comprises a pair of vertical, horizontally spaced and tubular members 61 and 62 (FIG. 8) of rectangular cross section interconnected by a plurality of plates 63 welded thereto. A third vertical tubular member 64 is between and parallel with the spaced tubular members 61 and 62. The tubular member 64 is secured to each of the plurality of plates 63 by a rib 66 which is substantially thinner than the tubular member 64 so that the plate 63, the tubular member 64 and the rib 66 define oppositely facing recesses 67 and 68. The tubular member 64 is coated on the outer surface thereof with a self-lubricating material 65, such as Teflon.

The leg 13 of the frame 11 is preferably identical to the leg 12 described hereinabove and, accordingly, the corresponding parts of the leg 13 are identified by the prime of the reference numerals applied to the leg 12.

A lift member 71 (FIG. 2) is slideably engaged with the vertical tubular members 64 and 64' of the legs 12 and 13, respectively. More particularly, C-shaped slides 72 and 72' are secured to the ends of the lift member 71. The slide 72 has flanges 73 and 74 which project into the recesses 67 and 68, respectively. A bearing block 76 is held within the slide 72 and is preferably made from a self-lubricating plastic, such as Teflon. The bearing block 76 is generally C-shaped in cross section and slideably engages the outer surface of the self-lubricating plastic coating 65 on the tubular member 64. Thus, the danger that lubricants will drip into and contaminate the solution in the treating tanks is eliminated.

The lift member 71 has a pair of integral L-shaped work bar-engaging hooks 77 and 78 (FIG. 2), which include oppositely extending, horizontal lift flanges 79 and 82. The horizontal flanges 79 and 82 have upwardly opening recesses.

The work bar 86 may be an elongated tubular member which is preferably longer than the width of each tank in the treating stations T–1 to T–10 illustrated in FIGS. 1 and 2. The work bar 86 is provided with inverted L-shaped brackets 87 and 88 which are secured to the work bar 86 and are preferably positioned outside of the hooks 77 and 78, respectively, on the lift member 71. The horizontal legs 89 and 91 of the brackets 87 and 88, respectively, extend toward each other and are vertically alignable with the horizontal flanges 79 and 82 of the hook members 77 and 78 when the carriage 10 is positioned at one of the treating stations or the loading and discharge stations illustrated in FIG. 1. The horizontal legs 89 and 91 are simultaneously receivable into the recesses in the flanges 79 and 82, respectively, whereby the work bar 86 is raised by the lift member. In this particular embodiment, a plurality of articles A which are to be treated are illustrated in dotted lines in FIG. 2 and are supported by the work bar 86 in any convenient manner. It is recognized, of course, that a plurality of lift bars may be provided on the carriage to simultaneously lift and lower a plurality of work bars 86.

The tanks or racks in each of the stations illustrated in FIG. 1 have upwardly opening recesses 92 on both sides thereof to receive the work bar 86 and to prevent a relative movement of the work bar 86 after it has been released by the lift member 71. For purposes of discussion, each of the recesses 92 illustrated in FIG. 1 is followed by a suffix corresponding to the number of the treating station. For example, the triangularly shaped recess at treating station 2 is referred to as recss 92–2.

A limit switch LS5 is secured to the lower end of the leg 13 (FIG. 2) and is positioned to engage one longitudinal end, here the left end as viewed in FIG. 2, of a work bar 86. The limit switch LS5 upon detecting the presence of a work bar 86 will prevent the lift 71 from lowering one work bar onto another work bar already in a treating station, thereby avoiding damage to the articles connected thereto. This circuitry will be discussed in detail hereinbelow.

MODIFIED CARRIAGE FRAME (FIGS. 18–19)

Figure 18:
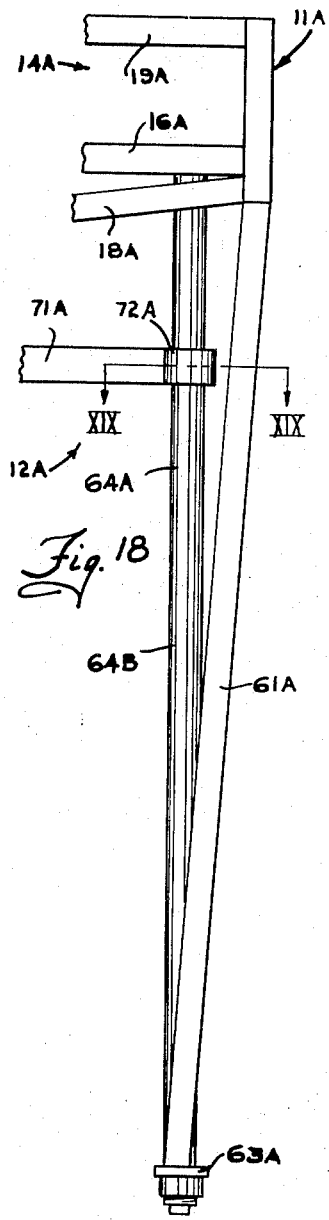
FIG. 18 is a fragmentary front elevational view of a modified carriage construction.
Figure 19:
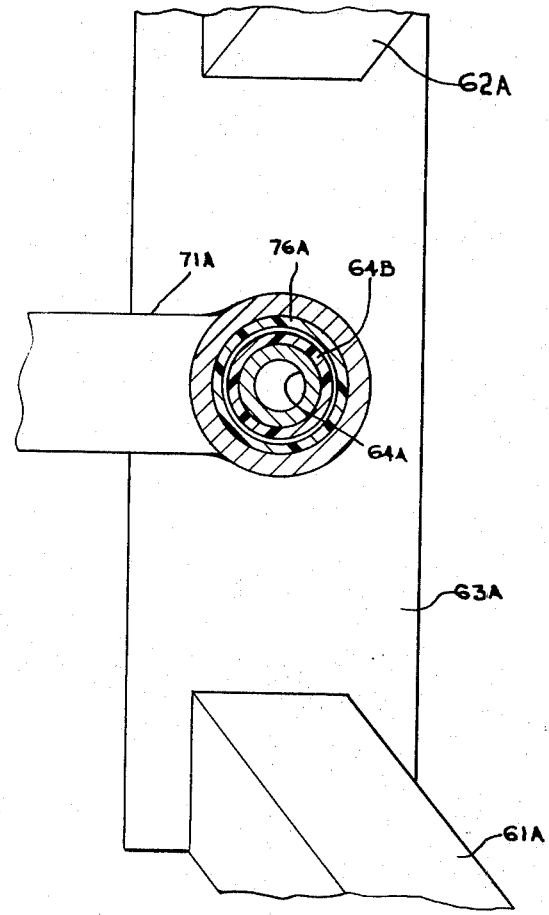
FIG. 19 is a sectional view taken along the line XIX—XIX in FIG. 18.

A modified carriage frame construction 12A is illustrated in FIGS. 18 and 19. Only the leg 12A is illustrated, it being understood that the corresponding depending leg on the opposite side of the carriage is identical. Parts of the modified leg 12A are identical to the structure described hereinabove and, accordingly, the same reference numerals will be used to designate corresponding parts of the leg 12A, but with the suffix "A" added thereto. The leg 12A of the frame 11A comprises a pair of generally vertical, horizontally spaced and tubular members 61A and 62A of rectangular cross section interconnected at the lower ends thereof by a plate 63A welded thereto. A third vertical tubular member 64A is connected between the spaced tubular members 61A and 62A and is secured at its upper end to the cross member 14A and at its lower end to the plate 63A. In this particular embodiment, the peripheral surface of the tubular member 64A is coated with a self-lubricating material 64B, such as Teflon.

A lift member 71A is slideably engaged with the vertical tubular member 64A. More particularly, a slide 72A, circular in cross sections, is telescoped over the self-lubricating material 64B of the tubular member 64A and is movable vertically relative thereto. The internal surface of the slide 72A is coated with a self-lubricating material 76A, such as Teflon. The self-lubricating material 76A sliderably engages the self-lubricating material and provides a substantially frictionless sliding engagement between the lift member 71A and the tubular member 64A.

DRIVE SYSTEM FOR THE CARRIAGE (FIGS. 2–7)

An electric drive motor 96 (FIG. 3) is secured to a gear reducer and differential 97 mounted on the mounting surface of the cross member 14. The output of the gear reducer and differential 97 is connected through a pair of flexible couplings 98 and 99 to a pair of drive shafts 101 and 102, respectively. The right end of the drive shaft 102 is rotatably supported in a bearing structure 103 (FIGS. 5 and 6) which is vertically slideably engaged with a pair of vertically extending and parallel rods 106 and 107 secured to and extending between a horizontal brace member 108 extending between the tubular members 16 and 17 and a horizontal bar 109 secured to and extending between the upper ends of the brace members 21. In this particular embodiment, the brace member 108 is reinforced by a plate 112 secured thereto along the lower surface thereof.

The bearing structure 103 comprises a block 113 having a pair of vertical openings 114 (one of which is illustrated in FIG. 6) extending therethrough and slideably receiving the rods 106 and 107 therein for permitting the block 113 to slide vertically thereon. The block 113 has an opening 115 through the center thereof which receives the shaft 102 therethrough. A bearing housing 116 is secured to one side of the block 113 by a plurality of bolts 117 and rotatably supports the right end of the shaft 102.

A rod 119 is secured to and extends upwardly from the bearing block 113 slideably through an opening 124 in the bar 109. A coil spring 121 is sleeved upon the rod 119 and held under compression between a washer 123 and the bar 109 whereby the shaft 102 is held about midway between the bar 109 and the brace member 108. A nut 122 is secured to the upper end of the rod 119 to limit upward movement of the washer 123 with respect to the upper end of the rod 119. Any tendency for the shaft 102 to move downwardly will be opposed by the corresponding compression of the spring 121 and accompanied by a sliding movement of the bearing structure 103 along the rods 106 and 107.

A wheel 126 (FIG. 6) is secured to the outer end of the drive shaft 102, so that it is aligned with the bottom surface 127 of the rails 34. By tightening the nut 122 on the rod 119, which compresses the spring 121, the pressure of the wheel 126 against the lower surface 127 of the flanges 37 is increased.

The wheel 126' and the bearing parts associated therewith at the left end of the shaft 101 (FIG. 3) may be identical with the corresponding parts of the wheel 126 and bearing structure 103. Thus, prime members of the same numerals will be used where applicable.

The motor 96 is provided with a normally engaged, electric brake 128 which is energized to disengage while the carriage 10 is transported along the rails 34 and 34', but is engaged automatically when the carriage reaches the proper station to prevent over travel. The carriage 10 is driven along the rails 34 and 34' by the wheels 126 and 126'. Upon a deenergization of the motor 96, the carriage 10 will coast until the brake 128 is de-energized and instantaneously stops the movement of the carriage 10.

POWER SYSTEM FOR LIFT (FIGS. 2–3)

An electric motor 131 is secured to a gear reducer and differential 132 which is secured upon the mounting surface of the cross member 14 (FIGS. 2 and 3). The output of the gear reduced and differential 132 is connected through a pair of flanged couplings 133 and 134 to a pair of drive shafts 136 and 137, respectively. The drive shafts 136 and 137 are rotatably supported near their outer ends by bearings 138 and 139, respectively, mounted on bearing support blocks 138A and 139A as illustrated in FIGS. 2 and 3. The drive shafts 136 and 137 extend beyond the bearings 138 and 139, respectively, and cable carrying drums 141 and 142 are secured to and rotatable with the outer ends of said shafts. A cable 143 (FIG. 2) supports the left end of the lift member 71 from the cable carrying drum 141, and cable 144 supports the right end of the lift member 71 from the cable carrying drum 142.

A sprocket 146 (FIG. 3) is secured to the drive shaft 136 and is rotatable therewith. A rotary cam switch housing 147 is secured upon the cross member 14 and has a shaft 148 supporting a sprocket 149 in radial alignment with the sprocket 146 on the drive shaft 136. An endless chain 151 interconnects the sprockets 146 and 149. The internal mechanism of the rotary cam switch housing 147, which is operated by rotation of shaft 136, will be further explained in the section entitled "Electrical Control System for the Conveying Machine."

A normally engaged electric brake 152, which is mounted on the electric motor 131 (FIG. 3) is energized to disengage while the cable carrying drums 141 and 142 are being rotated to unwind or take in cable 143 and 144, whereby to lower or raise the lift member 71, respectively. Upon a de-energization of the motor 131 and the brake 152, the rotary movement of the drums 141 and 142 will be instantaneously stopped to prevent a coasting thereof beyond the desired limits. The energization and de-energization of the motor 131 and brake 152 is controlled by the circuitry contained in the rotary cam switch housing 147.

The movement of the carriage 10 and parts thereof is controlled by the electrical circuitry illustrated in FIGS. 12A to 12D and FIG. 13. Three stepping drum programmers are utilized and are referred to as control 1, control 2 and control 3 in FIGS. 1 and 12A which perform a plurality of switching functions in the control circuitry to effect the movement of the carriage 10.

Alternating electrical potential is supplied to three conductors P–1, P–2 and P–3 (FIG. 12A) which are supported from plural brackets 181 (FIG. 2) secured to the rail 34'. Three sliding contacts 182, 183 and 184 engage the conductors P–1, P2 and P3, respectively, to supply alternating power to the motors 96 and 131 and the brakes 128 and 152 on the carriage 10.

Control signals, which will be explained in detail hereinbelow, are sent to and from the carriage 10 through the conductors P4, P5, P–6 and P–7 supported from a plurality of brackets 186 secured to the rail 34. Four sliding contacts 187, 188, 189 and 190 electrically engage the conductors P–4, P–5, P–6 and P–7, respectively, to transmit various switching signals which control the manner in which the alternating power supplied through the conductors P–1, P–2 and P–3 is applied to the motors 96 and 131 and the brakes 128 and 152.

A plurality of magnetic sensor relays or limit switches are secured to the brackets 186 and depend therefrom close in proximity to the mounting surface 22 on the carriage 10. The limit switches are referred to hereinafter as limit switches N–A, N–B and N–1 through N–10. These limit switches each switch a signal back through the control circuitry to inform the control unit as to the whereabouts of the carriage 10 relative to the treating stations T–1 to T–10.

SHUTTLE SYSTEM FOR THE LOAD AND UNLOAD STATIONS A AND B (FIGS. 10–11)

The shuttle device 156 at station B is identical to the shuttle device 156A at station A. Accordingly, the shuttle device 156 will be described in detail and the corresponding parts of shuttle device 156A will be identified by the same reference numerals, but with the suffix "A" added.

The shuttle device 156 comprises a pair of parallel and upright members 157 and 158 which are rigidly connected at their lower end to an elongated bar 159. A plate 161 is secured to the underside of the elongated bar 159 and the lower end of the upright member 157 and extends laterally from both sides thereof, as illustrated in FIG. 10. A plate 162 is secured to the underside of the elongated bar 159 and the lower end of the upright member 158 and extends laterally from both sides thereof. A pair of coaxial wheels 163 is secured to the underside of each of the plates 161 and 162, and said wheels engage tracks 164 to guide the movement of the shuttle device 156.

A tab 166 (FIG. 11) is secured to the underside of the plate 161 and extends downwardly from the right end thereof. Similarly, a tab 167 is secured to the underside of the plate 162 and extends downwardly from the left end thereof. A sprocket 168 is rotatably mounted adjacent the right end of travel of the shuttle tracks 164, and another sprocket 169 is rotatably mounted adjacent the left end of the shuttle track 164 and is radially aligned with the sprocket 168. The two sprockets 168 and 169 are preferably located between the rails 164 and are radially aligned with the elongated bar 159 of the shuttle device 156. An endless chain 171 interconnects the sprockets 168 and 169 and the upper reach 171 thereof is connected to the underside of the elongated bar 159 at 172.

A reversible motor 173 is connected through a gear reducer 174 to the chain-and-sprocket mechanism 176 to drive the sprocket 168. Thus, upon an energization of the motor 173, the sprocket 168 causes the upper reach of the chain to move to the left or to the right, as desired, to produce a movement of the shuttle device 156 to the left and to the right, respectively. Limit switches LS3 and LS4 are positioned at the left and right ends, respectively, of the tracks 164 to control the movement of the device 156. The limit switch LS3 is engaged by the tab 167 when the shuttle device 156 reaches the leftwardmost limit, and the tab 166 will engage the limit switch LS4 when the shuttle device 156 is in the position illustrated in FIGS. 10 and 11. The shuttle device 156A, which is preferably identical to the device 165, is driven by mechanism including the motor 173A.

The motors 173 and 173A (FIG. 10) are controlled by appropriate switching of relay contacts described in detail hereinbelow. The contacts SNA–2, SNA–3 and SNA–4 are normally open and are connected between the conductors L1, L2 and L3, respectively, and the input terminals 316, 317 and 318 of the motor 173A. The normally open contacts SOA–1, SOA–2 and SOA–3 are connected between the conductors L3, L2 and L1, respectively, an dthe input terminals 316, 317 and 318 of the motor 173A.

The normally open contacts SNB–2, SNB–3 and SNB–4 are connected between the conductors L1, L2 and L3, respectively, and the input terminals 321, 322 and 323 of the motor 173. The normally open contacts SOB–1, SOB–2 and SOB–3 are connected between the conductors L3, L2 and L1, respectively, and the input terminals 321, 322 and 323 of the motor 173.

ELECTRICAL CONTROL SYSTEM FOR THE CONVEYING MACHINE (FIGS. 12–16)

Referring to the electrical schematic illustrated in FIGS. 12A through 12D, three-phase alternating power is supplied to the lines L1, L2 and L3 through the closed circuit breaker contacts 191 and a set of normally closed emergency stop relay contacts E1, E2 and E3 to the conductors P–1, P–2 and P–3, respectively. Lines L2 and L3 are connected through a set of circuit breaker contacts 192 to the primary winding of a transformer 193. The secondary winding of the transformer 193 supplies electrical energy to a conductor 223 and, through the selector switch SS–1, to a conductor 194 and also to a conductor 196. Single-phase power is supplied by the conductors 194 and 196 to a D.C. rectifier 197 (FIG. 12D) for generating positive and negative D.C. potentials on the lines 198 and 199, respectively. The positive and negative signals on the conductors 198 and 199, respectively, are transmitted through normally open contacts to the conductors P–4, P–5, P–6 and P–7. The synchronization of the closing of these contacts is controlled by the stepping drum programmers control 1, control 2 and control 3 and by the control circuitry illustrated in FIGS. 12A through 12D, which will be explained in more detail hereinbelow.

The controls 1, 2 and 3 may be of the type illustrated in a pamphlet entitled "Tenor Stepping Drum Programmers" published by the Tenor Company in Milwaukee, Wis., in 1966. Each control 1, 2 and 3 is provided with a pair of input terminals identified as No. 3 and No. 8. The terminal No. 3 is intended to be connected to a continuous input to cause the programmer to index from one position to another as long as a signal is maintained on terminal No. 3. Terminal No. 8, on the other hand, will cause the control 1 to step from one index position to another upon the application of a signal thereto.

Figure 14:
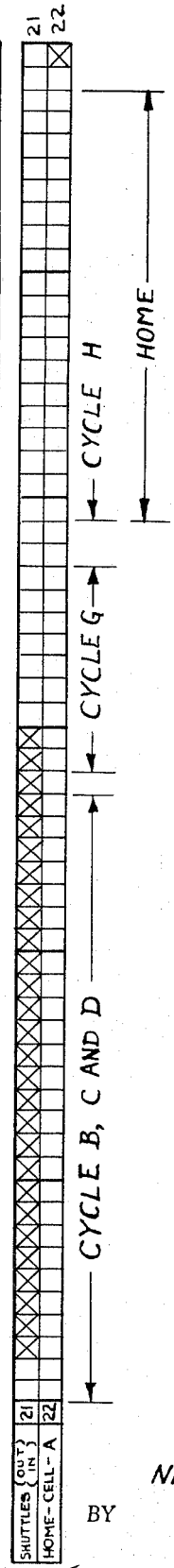
FIG. 14 is a program for control No. 1.

Control 1 is programmed according to the diagram illustrated in FIG. 14. More particularly, the vertical column of numbers near the left-hand side of the diagram indicates that there are 22 contacts. The horizontal line of numbers at the top of FIG. 14 indicates that there are 60 index stations. The "X's" in the central portion of the diagram identify the stations where certain ones of the contacts 1 to 22 become closed. For control 1, the contacts have been listed as "C–1–" followed by the number of the contact.

Figures 15, 16:
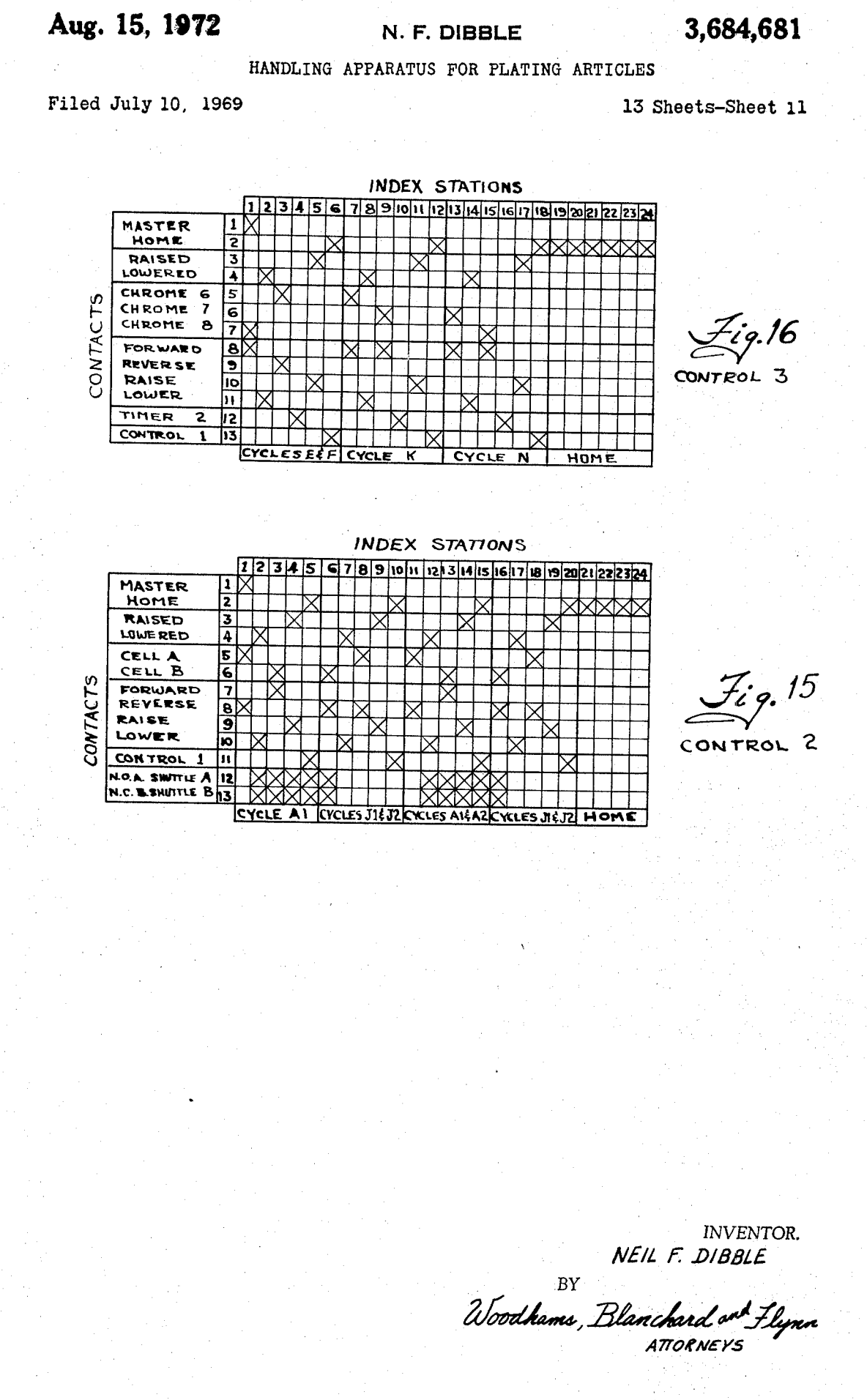

The program for control 2 is illustrated in FIG. 15. The vertical column of numbers at the left indicates that there are 13 contacts on the second control. These contacts will be referred to hereinafter as contacts "C–2–" followed by the number of the contact.

The program for control 3 is illustrated in FIG. 16. The vertical column of numbers indicates that there are 13 contacts in the third control. The contacts will be referred to hereinafter as "C–3–" followed by the number of the contact.

The conductor 194 is connected through the contacts SS–1 to the transformer secondary. An emergency stop switch E.M. Stop and an Emergency Stop Relay are connected in series between conductor 194 and the conductor 196. The conductor 194 is also connected through a normally open reset switch 177 and an emergency latch release 178 which, upon closing of the reset switch, will cause the Emergency Stop Relay to switch from one condition to another. The normally closed contacts E–1, E–2 and E–3 between the circuit breaker 191 and the conductors P–1, P–2 and P–3 are controlled by the Emergency Stop Relay when in the closed condition and operated by the latch release 178 when in the open condition. The normally open contact E–4 and a light 201 are connected in series between the conductors 194 and 196 so that the light will be illuminated upon an energization of the Emergency Stop Relay 177.

A conductor 195 interconnects one side of each of the controls 1, 2 and 3 to the conductor 194. The other side of each of the controls is connected to the conductor 196 to complete the circuits for supplying operating power to each of the controls 1, 2 and 3 to rotate the programmed drums.

A normally closed contact E–5 of the Emergency Stop Relay is connected in series with the conductor 194 so that upon an energization of the Emergency Stop Relay, the normally closed contact E–5 will open to de-energize the remainder of the hereinafter described circuit.

Figure 12C:
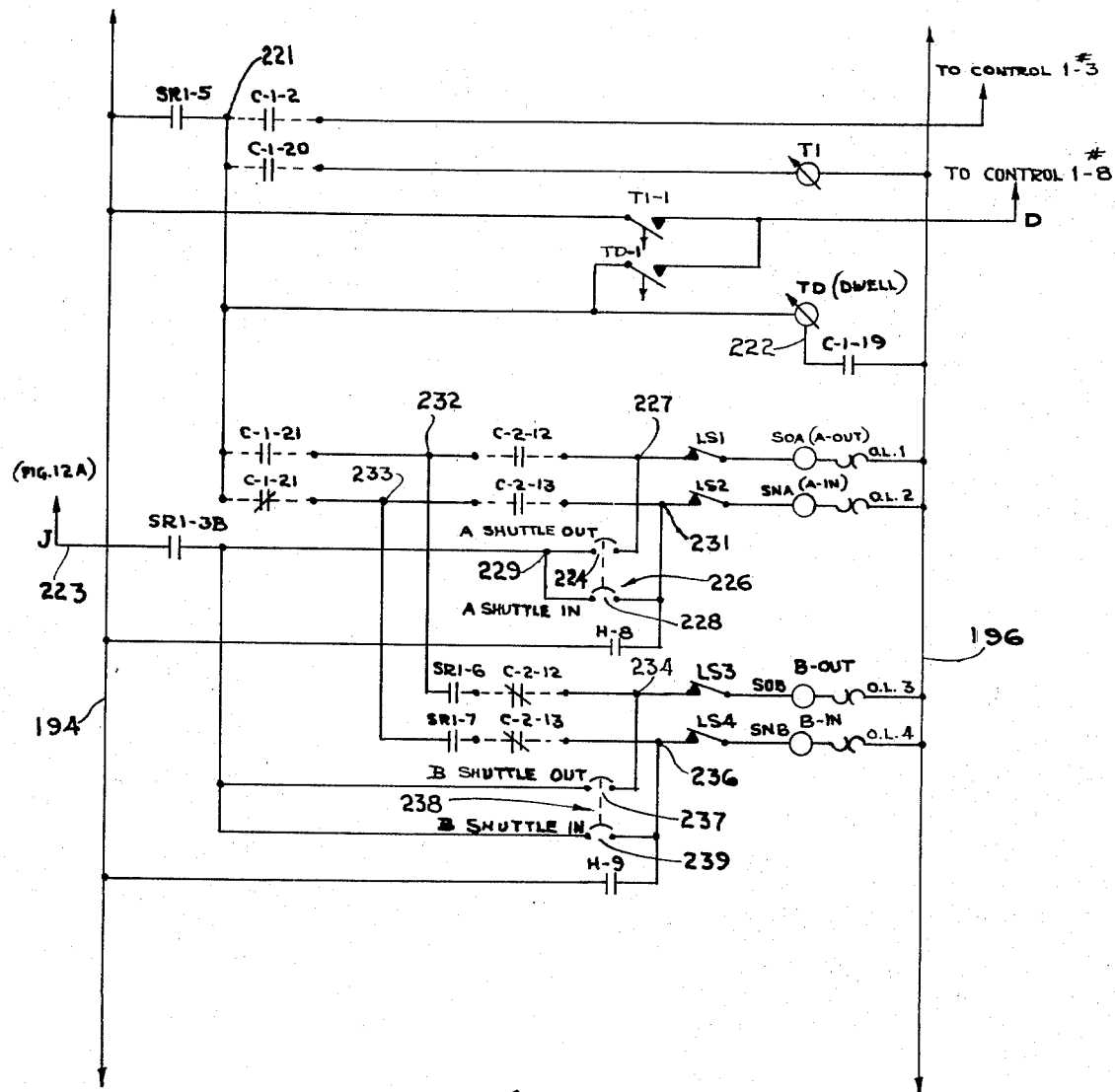

A normally open "home" switch is connected in series with a "home relay" and a normally closed contact SR1–1A between the conductor 194 and the conductor 196. The home relay has contacts H–1 to H–9 (FIGS. 12A, 12B and 12C). The normally open contacts H–1, C–2–1, C–3–1 and C–1–M and normally closed contacts SNB–1 and SNA–1 are connected in series with a home latch release mechanism HL between the conductors 194 and 196. When all of the aforesaid open relay contacts become closed, the home latch release mechanism HL will cause the home relay to switch from one condition to another independent of the closing of the "home" switch.

Normally open contacts H–2 and C–1–1 are series connected through a conductor 203 to further circuitry discussed in detail hereinbelow. The contact H–2 is also connected in series through normally closed contacts C–1–1 and C–1–M to terminal No. 3 on control 1.

The normally open contact H–3, the normally open contact of the limit switch N–A at station A, is connected in series with the pilot lamp 202 through junction point 204 between the conductors 194 and 196. A normally open contact CA–1 is connected in parallel with the pilot lamp 202. A pair of normally open contacts CA–1 and C–1–22 are series connected between the junction point 204 and terminal No. 3 of control 1.

The normally open contact H–4 and a normally closed contact C–2–1 and a normally closed contact SR1–1B are connected in series between the conductor 194 and terminal No. 3 of control 2. Similarly, the normally open contact H–5, a normally closed contact C–3–1 and a normally closed contact SR1–1C are connected in series between the conductor 194 and terminal No. 3 of control 3.

The normally closed contact H–6 is connected in series with a normally open contact SR1–1 and a relay SR1 between the conductors 194 and 196. A first set of normally open terminals on a start switch 205 are connected in parallel with the relay contact SR1–1 and in series with a pilot light 210 to conductor 196 so that when the start switch 205 is closed, the relay SR1 will become energized to close the contacts SR1–1 to "lock in" the relay SR1 and the pilot light 210 will ignite.

A normally open relay contact SR1–2 is connected in series with a parallel connected circuit between the conductors 194 and 196 wherein one leg of the parallel circuit consists of a series connected normally open contact C–1–5 and a relay CR–2 and the other leg of the parallel circuit consists of a series connected normally open contact C–1–11 and a relay CR–3.

A pair of normally open contacts RD and C–1–3 are series connected to a normally open contact H–5A through contact C–1–M to terminal No. 3 of control 1. The contacts RD and C–1–3 are also series connected through a normally open contact SR1–3A to terminal No. 8 of control 1.

A pair of series connected, normally open contacts LD and C–1–4 are connected through a normally open contact SR1–3 to terminal No. 8 of control 1. Series connected pairs N–1, C–1–6; N–2, C–1–7; N–3, C–1–8; N–4, C–1–9; N–5, C–1–10; N–9, C–1–12; and N–10, C–1–13 are connected in parallel with the contacts LD and C–1–4.

Referring to FIG. 12B, normally open contact SR1–4 is connected in series with normally closed contacts C–1–5, C–1–11 and C–1–2 between conductor 194 and conductor 203. Normally open contact C–1–14 is connected in series with series connected normally closed contacts CR2–1 and CR3–1, a forward relay FR and normally closed contacts TS–1 between the conductors 203 and 196. A pair of normally open contacts C–2–7 and CR2–2 are connected in series between the conductor 206 and the junction point 200 located between the contact CR3–1 and the relay FR. A pair of normally open contacts C–3–8 and CR3–2 are connected in series between the junction point 200 and a conductor 207.

A normally open contact C–1–15 is connected in series with normally closed contacts CR2–3 and CR3–3, a reverse relay RR2 and the normally closed contacts TS–1 between the conductors 203 and 196. A pair of normally open contacts C–2–8 and CR2–4 are connected between the conductor 206 and a junction point 208 located between the contact CR3–3 and the reverse relay RR2. A pair of normally open contacts C–3–9 and CR3–4 are connected between the conductor 207 and the junction point 208.

A fast traverse timer FST is connected in series with a normally open contact C–1–16 between the conductors 196 and 203.

A normally open contact C–1–17 is connected in series with a pair of normally closed relay contacts CR2–5 and CR3–5, a raise relay RR1 and a normally closed contact HS–1 between the conductors 203 and 196. A pair of normally open contacts C–2–9 and CR2–6 are connected between the conductor 206 and a junction point 211 located between the contact CR3–5 and the raise relay RR1. A pair of normally open contacts C–3–10 and CR3–6 are connected between the junction point 211 and the conductor 207.

A normally open contact C–1–18 is connected to a pair of series connected normally closed contacts CR2–7 and CR3–7, a lower relay LR and the contacts HS–1 between the conductors 203 and 196. A pair of normally open contacts C–2C10 and CR2–8 are connected in series between conductor 206 and a junction point 212 located between the contact CR3–7 and the lower relay LR. A pair of normally open contacts C–3–11 and CR3–8 are connected between the junction point 212 and the conductor 207.

Normally closed contacts C–1–15, C–1–14, CR3–10 and CR2–10 are series connected with a first set of terminals of a stop switch 213 and a traverse stop relay TS between the conductors 203 and 196. Normally closed contacts C–1–18, C–1–17, CR3–11 and CR2–11 are series connected with a second set of terminals of the stop switch 213 and a hoist stop relay HS between the conductors 203 and 196. Normally closed contacts C–2–8 and C–2–7 are series connected with normally open contoct CR2–9 between conductor 206 and junction point 214 located between the contact CR2–10 and the first set of terminals of the stop switch 213. The normally closed contacts C–3–9 and C–3–8 are series connected with the normally open contact CR3–9 between the junction point 214 and the conductor 207. The normally closed contacts C–2–10 and C–2–9 are series connected with the normally open contact CR2–12 between conductor 206 and the junction point 216 located between the contact CR2–11 and the second set of contacts on the stop switch 213. A pair of normally closed contacts C–3–11 and C–3–10 are series connected with the normally open contact CR3–12 between the junction point 216 and the conductor 207.

The normally closed contact H–7 is connected in series with the second set of normally closed terminals of the start switch 205 and a normally open contact TS–2 between the conductor 194 and the junction point 218 located between the first set of contacts on the stop switch 213 and the relay TS. A normally open contact HS–2 is connected between the start switch 205 and the junction point 219 located between the second set of contacts on the stop switch 213 and the relay HS. A normally open contact HS–3 and a pilot light 215 are series connected between the junction point 217 and the conductor 196. A normally open contact TS–3 is connected in parallel with the contact HS–3.

Referring to FIG. 12C, a pair of series connected normally open contacts SR1–5 and C–1–2 are connected between the conductor 194 and terminal No. 3 of control 1. A normally open contact C–1–20 is connected in series with a timer T1 between the conductor 196 and the junction point 221 located between the normally open contacts SR1–5 and CC–1–2. The contacts T1–1 for the timer T1 are connected between the conductor 194 and terminal No. 8 of control 1. A dwell timer TD is connected in series with a normally open contact C–1–19 between the junction point 221 and the conductor 196. The contact TD–1 of the timer TD is connected between the junction point 221 and terminal No. 8 on control 1.

The following circuitry relates to the control of the shuttle devices in stations A and B. The normally open contacts C–1–21 and C–2–12, the switch LS1, a relay SOA and an overload circuit breaker OL1 are connected in series between the junction point 221 and the conductor 196. A normally closed contact C–1–21, a normally open contact C–2–13, the switch LS2, the relay SNA and an overload circuit breaker OL2 are connected in series between the junction point 221 and the conductor 196. Referring to FIG. 12A, the conductor 223 is connected to line 194 between the selector switch SS–1 and the secondary winding of the transformer 193. Conductor 223 (FIG. 12C) is also connected through an open contact SR1–3B and terminals 224 of a manually operated switch 226 to the junction point 227 located between the contact C–2–12 and the switch LS1. The terminals 228 of the switch 226 are connected between a junction point 229, located between the terminals 224 and the contacts SR1–3B, and a junction point 231 located between the contacts C–2–13 and switch LS2. A normally open relay contact H–8 is connected between the conductor 194 and the junction point 231. The normally open contact SR1–6, the normally closed contact C–2–12, the switch LS3, the relay SOB and an overload circuit breaker OL3 are connected in series between a junction point 232 located between the normally open contacts C–1–21 and C–2–12 and the conductor 196. The normally open contact SR1–7, the normally closed contact C–2–13, the switch LS4, the relay SNB and an overload circuit breaker OL4 are connected in series between the junction point 233, located between the contacts C–1–21 and C–2–13, and the conductor 196.

The normally open terminals 237 of a manually operable switch 238 are connected between the junction point 229 and a junction point 234 located between contact C–2–12 and switch LS3. The normally open terminals 239 of the switch 238 are connected between the junction 229 and a junction point 236 located between the contact C–2–13 and the switch LS4. A normally open contact H–9 is connected between the conductor 194 and the junction point 236.

Referring to FIG. 12D, a pair of normally open contacts SR1–8 and C–2–2 are series connected between the conductor 194 and terminal No. 3 on control 2. Conductor 206 (FIG. 12B and 12D) is connected to a junction point 242 located between the contacts SR1–8 and C–2–2. A normally open contact C–2–11 is connected between the junction point 242 and terminal No. 8 of control 1. The normally open contacts RD–1 and C–2–3 are connected in series with a normally open contact CR2–13 between the conductor 194 and terminal No. 8 of control 2. The pairs of series connected, normally open contacts LD–1 and C–2–4, N–A and C–2–5, and N–B and C–2–6 are all connected in parallel with RD–1 and C2–3 between conductor 194 and contact CR2–13.

A pair of normally open contacts SR1–10 and C–3–2 are connected in series between conductor 194 and terminal No. 3 of control 3. The conductor 207 (FIGS. 12B and 12D) is connected to a junction point 243 located between the normally open contacts SR1–10 and C–3–2. A normally open contact C–3–13 is connected between the junction point 243 and terminal No. 8 of control 1. A normally open contact C–3–12 and a timer T2 are series connected between the junction 243 and the conductor 196. The contact T2–1 of the timer T2 is connected between the junction 243 and terminal No. 3 of control 3.

A plurality of parallel pairs of normally open contacts are connected in series with a normally open contact CR3–13 between terminal No. 8 of control 3 and conductor 194. The plurality of pairs comprises normally open contacts RD–2 and C–3–3, LD–2 and C–3–4, N–6, and C–3–5, N–7 and C–3–6, and N–8, and C–3–7.

The positive output conductor 198 of the rectifier 197 is connected through normally open contacts RR1–2, FR–2 and FST–2 to the conductors P–5, P–6 and P–7, respectively. Conductor 198 is also connected through normally open contacts LR–2 and RR2–2 and the junction point 246 to ground.

The negative conductor 199 is connected through normally open contacts RR1–1, FR–1 and FST–1 to the grounded junction point 246. Further, the conductor 199 is connected through normally open contacts LR–1 and RR2–1 to the conductors P–5 and P–6, respectively.

The anode of a rectifier 247 is connected to one side of a relay LD, and the cathode of a rectifier 248 is connected to one side of a relay RD. The series connected relay LD and rectifier 247 are connected in parallel with the series connected relay RD and rectifier 248 between the grounded junction point 246 and the conductor P–4.

A proximity switch relay 313 (FIG. 2) is mounted on the mounting surface 22 of cross member 14 and is positioned to operate in response to the presence of the limit switches N–A, N–B and N–1 to N–10, which are located along the rail 34, as illustrated in FIG. 1. An elongated bar 314 is secured on the mounting surface 22 and is aligned with the limit switches N–A, N–B and N–1 to N–10. As one end of the bar comes into the presence of one of the limit switches N–A, N–B and N–1 to N–10, a switching function will occur to initiate a change in the operation of the carriage 10. The proximity switch relay 313 will effect a de-energization of the traverse motor 96 so that the carriage will coast until the brake is de-energized so as to quickly, if not instantaneously, stop the carriage at a predetermined location. This action, however, will be discussed in further detail hereinbelow.

Referring to FIG. 13, alternating electrical power is received from the conductors P–1, P–2 and P–3 by the sliding shoes 182, 183 and 184, respectively. The electrical power is transmitted through the circuit breaker 249 and fuses 251 to junction points 252, 253 and 254. A primary winding of the transformer 256 is connected between the junction points 252 and 254.

The input terminals 266, 267 and 268 of the hoist motor 131 are connected, respectively, through normally open contacts U–3, U–2 and U–1 to the junction points 254, 253 and 252, respectively. Further, the input terminals 266, 267 and 268 of the hoist motor 131 are connected through normally open contacts D–1, D–2 and D–3 to junction points 252, 253 and 254, respectively. The input terminals 271, 272 and 273 to the brake 152 are connected, respectively, to the junction points 268, 267 and 266, respectively.

There are two sets of input terminals to the traverse motor 96. The input terminals 274, 276 and 277 are connected to the "slow" winding for the motor 96 and the input terminals 278, 279 and 281 are connected to the "fast" winding of the motor 96.

The input terminals 274, 276 and 277 are connected, respectively, through overload circuit breakers 275, the normally closed contacts FS–1, FS–2 and FS–3 and the normally open contacts F–1, F–2 and F–3 to the junction points 252, 253 and 254, respectively.

The input terminals 278, 279 and 281 of the traverse motor 96 are connected, respectively, through overload circuit breakers 280 and normally open contacts FS–4, FS–5 and FS–6 to junction points 282, 283 and 284, respectively. Normally open contacts FS–4, FS–5 and FS–6 are respectively connected in series with the contacts R–1, R–2 and R–3 to the junction points 252, 253 and 254.

The input terminals 286, 287 and 288 of the brake 128 are connected through normally open contacts TR–1, TR–2 and TR–3, respectively, to junction points 252, 253 and 254.

The secondary winding of the transformer 256 is connected on one side through a fuse 255 and switch 257 to a conductor 258 and, on the other side, to a conductor 259. The conductors 258 and 259 are connected to opposite sides of a D.C. rectifier 261, the output conductors 262 and 263 of which carry positive and negative D.C. potential respectively.

A selector switch 289 having an "automatic" and a "manual" position has two sets of terminals 291 and 292, wherein the first set of terminals 291 are connected in the "automatic" position (as shown in dotted lines) between the conductor 258 and a junction point 293. A normally open contact UP–1, a normally closed contact RL–1 of the rotary cam switch 147, here shown in the open position because the lift 71 is in the raised position, a relay U and a plurality of series connected normally closed contacts OL, OL, TR4, F4 and R4 are series connected between the junction point 293 and the conductor 259. A normally closed limit switch LS5, a normally open contact DP–1, a normally closed contact RL–2 of the rotary cam switch 147, and a relay D are series connected between the junction point 293 and a junction point 294 located between the relay U and the contacts OL, OL.

The first set of terminals 291 in the "manual" position connect the conductor 258 to a junction point 296 which is connected through a manually operated switch JS–U to the junction point 297 located between the normally open contact UP–1 and the switch contact RL–1. Further, the junction point 296 is connected through a manually operated switch JS–D to a junction point 298 located between the normally open contact DP–1 and the switch contact RL–2.

A normally closed limit switch LS6 is mounted at the right end of the rail 34 (FIG. 1) and is aligned with the limit switches N–A, N–B and N–1 to N–10 and is operable by the elongated bar 314. The normally closed limit switch LS6, a normally open contact FP–1 (FIG. 13), a relay F and a plurality of normally closed relay contacts OL, OL, U4 and D4 are series connected between the junction point 293 and the conductor 259. A normally open contact RP–1 and a relay R are series connected with the aforesaid relay contacts OL, OL, U4 and D4 between the junction point 300, located between the limit switch LS6 and the contact FP–1, and the conductor 259. The junction point 296 is connected through a manually operated switch JS–F to a junction point 299 located between the normally open contact FP–1 and a relay F. A manually operated switch JS–R is connected between junction point 296 and a junction point 301 located between the contact RP–1 and the relay R.

A light 302 is connected between the conductors 258 and 259 to signal the presence of electrical power at the carriage 10. A normally open contact FSP–1 is connected in series with a relay FS between the conductors 258 and 259.

A normally open contact F5 is series connected with a relay TR between the conductors 258 and 259. A normally closed contact 303 of the proximity switch relay 313 is series connected with the normally open contact TR–4, and both are connected in parallel with the normally open contact F5. Further, a normally open contact R5 is connected in parallel with the normally open contact F5.

The second set of terminals 292 of the selector switch 289, when in the "automatic" position (as shown in dotted lines), connect a grounded junction point 304 to a conductor 306. The junction point 304 is connected through switch contact RL–4 of the rotary cam switch to the conductor 263 of the rectifier 261. The junction point 304 is also connected through the switch contact RL–3 to the conductor 262 of the rectifier 261.

The conductor 262 is connected through switch contact RL–5 to the conductor P–4, and the conductor 263 is connected through the switch contact RL–6 to the conductor P–4. The conductor 306 is connected through the relay UP and a rectifier 307 to the conductor P–5. The conductor 306 is also connected through a relay DP and a rectifier 308 to the conductor P–5. The direction of rectifier 307 is reversed from that of the rectifier 308 so as to distinguish the signals which pass through the corresponding relays. That is, a positive signal received on the conductor P–5 from the rectifier 197 (FIG. 12D) is transmitted through the rectifier 307 to energize the relay UP, and a negative signal received on the conductor P–5 will pass through the rectifier 308 to energize the relay DP.

The conductor 306 is further connected through a relay FP and a rectifier 309 to the conductor P–6, and through a relay RP and a rectifier 311 to the conductor P–6. A positive signal received on the conductor P–6 will be transmitted through the rectifier 309 to energize the relay FP, and a negative signal on the conductor P–6 will be transmitted through the rectifier 311 to energize the relay RP.

The conductor 306 is also connected through a relay FSP and rectifier 312 to the conductor P–7. Thus, only a positive signal can reach the line P–7 through the rectifier 312 to energize the relay FSP.

OPERATION

The operation of the device embodying the invention will be summarized hereinbelow even though such operation will be apparent from the foregoing description.

Referring to FIG. 12A, conductors P-1, P-2 and P-3 are energized through the normally closed contacts E-1, E-2 and E-3 and the closed circuit breaker contacts 191 from the lines L1, L2 and L3. The conductors L1, L2 and L3 supply power to the motors 173 and 173A (FIG. 10) when the appropriate contacts between the conductors L1, L2 and L3 and the input terminals 316, 317, 318 and 321, 322, 323 are closed. The conductors 194 and 196 are energized from the transformer 193 which receives its power from lines L2 and L3 through closed circuit breaker 192.

Referring to FIG. 13, power is supplied to the junction points 252, 253 and 254 through the closed circuit breaker 249 from the sliding shoes 182, 183 and 184 which engage the conductors P-1, P-2 and P-3, respectively. However, no power is immediately supplied to the traverse motor 96 and the brake 128 due to the normally open contacts F-1, F-2, F-3 and R-1, R-2, R-3 and TR-1, TR-2 and TR-3. Likewise no power is immediately supplied to the hoist motor 131 or the brake 152 due to the normally open contacts U-1, U-2, U-3 and D-1, D-2, D-3. Power is also supplied through the transformer 256 to the conductors 258 and 259 to energize the rectifier 261. If the lift 71 (FIG. 2) is in the raised condition, the contacts RL-3, RL-4, RL-5 and RL-6 (FIG. 13) will be in the position shown so that the negative side of the rectifier 261, namely, the conductor 263 will be connected through the contacts RL-4 to ground. The conductor 262 will supply a positive signal to the conductor P-4. It will be assumed that the selector switch 289 has been moved to the "automatic" position to connect the conductor 258 with the junction point 293 and to connect the junction point 304 with the conductor 306.

Referring to FIG. 12A again, the conductors 194 and 196 become energized upon closing of the selector switch SS-1, which illuminates the light 202 to indicate that power has been supplied to the conductors 194 and 196.

PRESETTING OF CONTROL PROGRAMS AND CARRIAGE

In order to place the carriage in a position for starting, the "home" switch (FIG. 12A) must be closed to energize the home relay H, which closes the normally open contacts H-1 through H-5, H-5A, H-8 and H-9. Normally closed contacts H-6 and H-7 will open, whereby electrical power flows from conductor 194 through the closed contact H-2 and the normally closed contacts C-1-1 and C-1-M to terminal No. 3 of control 1. Terminal No. 3 of control 2 is also energized through the closed contact H-4 and the normally closed contacts C-2-1 and SR1-1B. Terminal No. 3 of control 3 is energized through the closed contact H-5 and the normally closed contacts C-3-1 and SR1-1C.

Energization, as aforesaid, of terminals No. 3 of the controls 1 to 3 results in a continuous stepping movement of the programmed drums. This means, and referring to FIGS. 14-16, that the drums will move through the various indexing stations until the signal is removed from the terminals No. 3. This occurs, for example, in control No. 1 when index station 59 is reached wherein contact C-1-1 is caused to change condition, which means that the normally closed contact C-1-1 will open to de-energize terminal No. 3 of control 1. Terminal No. 3 of control 2 will remain energized until index station No. 1 of control 2 (FIG. 15) is reached wherein contact C-2-1 will change from a normally closed condition to an open condition to thereby de-energize terminal No. 3. Terminal No. 3 of control 3 will remain energized until index station No. 1 is reached on control 3 as illustrated in FIG. 16 which will open C-3-1 and thereby de-energize terminal No. 3. When all of this has been completed, controls 1, 2 and 3 are preset and ready to begin a synchronized program of operation.

The closing of contacts H-8 and H-9 (FIG. 12C) will result in energization of the relays SNA and SNB, respectively, to close the contacts SNA-2, SNA-3 and SNA-4 and the contacts SNB-2, SNB-3 and SNB-4 which energizes the motors 173 and 173A (FIG. 10) to move the shuttles A and B respectively, to the positions illustrated in solid lines in FIG. 10, at which time the limit switches LS2 and LS4 will become opened to de-energize the relays SNA and SNB (FIG. 12C) and close the contacts SNA-1 and SNB-1 after which time shuttles A and B are in position for starting. At the start, shuttle A is empty and shuttle B is loaded.

At index station No. 59 in control 1, contacts C-1-1, C-1-2, C-1-3, C-1-5 and C-1-7 are energized. Contact C-1-17 (FIG. 12B) will close to energize the relay RR1 which will in turn close the contacts RR1-1 and RR1-2 (FIG. 12D) so that a positive D.C. signal is applied to the conductor P-5. Referring to FIG. 13, and if the lift 71 is not in the raised condition, a positive signal on the conductor P-5 will energize the relay UP to close the contact UP-1 whereby the relay U will be energized through the closed switch contact RL-1 to close the contacts U-1, U-2 and U-3 to energize simultaneously the hoist motor 131 and the electric brake 152, whereby the lift 71 is moved upwardly from the solid line position in FIG. 2 to the dotted line position.

When the lift has reached the dotted line position in FIG. 2, the rotary cam switch 147 will cause the contact RL-1 to open and simultaneously therewith cause the contacts RL-4 and RL-5 to close (if they were previously open) so that a positive D.C. signal is applied to the conductor P-4. Referring to FIG. 12D a positive signal on conductor P-4 will cause an energization of the relay RD to effect a closing of the contact RD (FIG. 12A) to permit a flow of current through the contacts RD, C-1-3 and the now closed contact H-5A to terminal No. 3 of control 1. This will advance the program for control 1 (FIG. 14) one index station whereupon contact C-1-3 becomes open again to de-energize terminal No. 3 of control 1 to place the program at index station No. 60. No signal is yet applied to terminal No. 8 of control 1 since the contact SR1-3A is open.

At index station No. 60, contacts C-1-1, C-1-2, C-1-15 and C-1-22 are energized. As a result, current will flow through the now closed contacts H-2, C-1-1 and C-1-15 (FIG. 12B) interconnected by the conductor 203 to energize the relay RR2. This will cause a closing of the normally open contacts RR2-1 and RR2-2 (FIG. 12B) to connect the conductor P-6 to the negative conductor 199 of the rectifier 197 and, simultaneously therewith, connect the positive conductor 198 of the rectifier 197 to the grounded junction point 246. This will cause a negative signal to be transmitted through conductor P-6 so that the reverse relay RP (FIG. 13) is energized causing a closing of the contact RP-1 to energize the relay R. This will cause the contact R-5 to close to energize the relay TR to effect a closing of the contacts TR-1, TR-2, TR-3 and TR-4 to energize the brake 128 causing same to disengage. The relay TR is thereby "locked in" through the contacts 303 and TR-4. Simultaneously therewith, the contacts R-1, R-2 and R-3 will close to energize the transverse motor 96 to effect a reverse movement of the carriage to the left (FIG. 1) to move the carriage toward station A. When station A is approached, the elongated bar 314 (FIG. 3) will engage the limit switch N-A for station A and close the switch N-A (FIGS. 12A and 12D) to supply a signal through the closed contacts C-2-5 and CR2-13 to terminal No. 8 of control 2 to advance the program for control 2 to index station No. 2. This will immediately result in a de-energization of the traverse motor 96 due to the opening of the contacts R-1, R-2 and R-3 but, since the relay TR is "locked in" by the closed contacts 303 and TR–4, the brake 128 remains energized to permit the carriage to coast further toward station A. When the proximity switch relay 313 becomes located opposite the limit switch N–A, the contact 303 (FIG. 13) will open to de-energize the relay to effect an opening of the contacts TR–2, TR–3 and TR–4 to effect an instantaneous application of the brake 128 to stop the carriage 10 precisely at station A.

Simultaneously therewith, current will through the closed contact H–3 (FIG. 12A) now close switch N–A to effect an ignition of the pilot light 202 and an energization of the relay CA. Energization of the relay CA will effect a closing of the contact CA–1 so that current will flow therethrough and the now closed contact C–1–22 to energize terminal No. 3 of control 1 to advance the program (FIG. 14) one index station whereupon contact C–1–M becomes energized to open the normally closed contact (FIG. 12A) thereof to de-energize terminal No. 3 of control 1 to maintain the program at index station No. 1.

If the lift 71 had not been in the raised condition as stated above, the foregoing procedure would have occurred except that the time required for raising the lift from the lowered position to the raised position would have been eliminated and the program for control 1 would have been immediately advanced from index station No. 59 to index station No. 60.

After index station No. 1 has been reached in control 1 and index station No. 1 has been reached in controls 2 and 3, and after the shuttles in stations A and B have been moved to the solid line positions illustrated in FIG. 10 and the lift 71 has been raised to the dotted line position illustrated in FIG. 2 and the carriage 10 is positioned at station A with the lift 71 in the raised condition, all of the contacts H–1, C–2–1, C–3–1, C–1–M, SNB–1 and SNA–1 (FIG. 12A) are closed to energize the home latch release to cause a de-energization of the relay H. The operator can now prepare to close the start switch 205.

START OF SEQUENCED OPERATION FOR CYCLE I

With the contacts H–6 and H–7 back in the normally closed condition due to a de-energization of the home relay H, and the pilot light 202 ignited, the operator may then actuate the start switch 205 to close the first contact thereof to energize the relay SR1 which will result in a change in condition of all of the relay contacts having the prefix "SR1." The contact SR1–1 will close and thereby "lock in" the relay SR1 in an energized condition. The second contact (FIG. 12B) of the start switch 205 will open upon a closing of the first contacts. If, for example, and prior to an opening of the second contact of the start switch 205, an emergency arose, the stop switch 213 (FIG. 12B) could be closed to energize the relays TS and HS from the energized conductor 203. An energization of the relays TS and HS would effect an opening of the contacts TS–1 and HS–1 to de-energize each of the relays SR, RR2, RR1 and LR and halt the movement of the carriage 10. Simultaneously therewith, the contacts TS–2, HS–2, TS–3 and HS–3 would be closed to "lock in" the relays TS and HS and cause an ignition of the pilot light 215 to indicate to the operating personnel that the emergency switch 213 has been closed. The relays TS and HS are de-energized by an opening of the second contact of the start switch 205 to reset all of the contacts thereof back to the original condition illustrated in FIG. 12B.

Since the program for control 1 (FIG. 14) indicates that contacts C–1–M and C–1–5 at index station No. 1 are energized, contact C–1–5 (FIG. 12A) will close to energize the relay CR2, which will result in a change in condition of all of the contacts having a prefix "CR2." Thus, referring to FIG. 12B, the relays FR, RR2, RR1 and LR are controlled only by controls 2 or 3 during the time that contacts C–1–5 or C–1–11 are energized.

CYCLE A1 (FIG. 17)

At index station No. 2 of control No. 2 (FIG. 15), contacts C–2–4 and C–2–10 become energized as well as contacts C–2–12 and C–2–13. Since both of the shuttles A and B are in an aligned path with the carriage 10, an energization of the contacts C–2–12 and C–2–13 (FIG. 12C) will cause no change in the location of the shuttles due to the present condition of the normally open and normally closed contacts C–1–21. The now closed contacts C–2–10 and CR2–8 (FIG. 12B) energize the relay LR to close the contacts LR–1 and LR–2 in FIG. 12D. This results in a grounding of the positive side of the rectifier 197 so that a negative signal is applied to the conductor P–5. Referring to FIG. 13, a negative signal on the conductor P–5 will energize the relay DP. This will result in a closing of the contact DP–1 to energize the relay D to cause a closing of the contacts D–1, D–2 and D–3 which simultaneously energizes the brake 152 and the lift motor 131 to lower the lift 71 to the solid line position of FIG. 2. This lowering movement has been schematically illustrated in FIG. 17 by the arrow 326.

If, for example, shuttle A had been loaded with a work bar 86, the lift 71 would not have lowered because it would have been detected by the safety switch LS5 which would have been opened, thereby preventing an energization of the relay D. This safety switch LS5 will prevent damage to articles hanging from the work bars carried by the lift 71 as described hereinafter with respect to the process.

Since, as stated above, shuttle A is in an unloaded condition, a lowering of the lift 71 in station A will not be obstructed by the presence of the work bar.

When the hoist has become lowered, the contacts RL–4 (FIG. 13) and RL–5 will open and contacts RL–3 and RL–6 will close so that the positive side of the rectifier 261 will become grounded and a negative signal will be applied to the conductor P–4. Referring to FIG. 12D, the negative signal applied on the conductor P–4 by the circuitry on the carriage 10 will result in energization of the relay LD to close the contacts LD–1 which will apply a signal through the now closed contacts C–2–4 and CR2–13 to energize terminal No. 8 of control 2 to advance the program to index station No. 3.

At index station No. 3 in control 2, contacts C–2–6, C–2–7, C–2–12 and C–2–13 are energized. Energization of the contacts C–2–12 and C–2–13 will cause no change in the position of the shuttles in stations A and B. Closing of contact C–2–7 (FIG. 12B) will energize the relay FR to close the contacts FR–1 and FR–2 in FIG. 12D. This will result in a grounding of the conductor 199 of the rectifier 197 and the application of a positive signal to conductor P–6. Referring to FIG. 13, a positive signal received on the conductor P–6 will energize the relay FP, thereby closing the contact FP–1 to energize the relay F. This will cause a closing of the contacts F–1, F–2, F–3 and F–5 to energize simultaneously the traverse motor 96 and the relay TR, thereby closing the contacts TR–1, TR–2 and TR–3 to permit energization of the brake 128 for disengaging same so that the traverse motor 96 can move the carriage 10 from station A in a forward direction toward station B. When station B is approached, the elongated bar 314 (FIG. 3) will engage the limit switch N–B for station B and close the switch N–B (FIG. 12D) to supply a signal through the closed contacts C–2–6 and CR2–13 to terminal No. 8 of control 2 to advance the program for control 2 to index station No. 4. This will immediately result in a de-energization of the traverse motor 96 due to the opening of the contacts F–1, F–2 and F–3 but, since the relay TR is "locked in" by the closed contacts 303 and TR–4, the brake 128 remains energized to permit the carriage to coast further toward station B.

Since the lift 71 is in the lowered position (solid line position in FIG. 2), the horizontal flanges 79 and 82 of the hooks 77 and 78 are spaced below the horizontal legs 89 and 91 of the hooks 87 and 88 on the work bar 86 in station B. As a result, the hooks 77 and 78 will move toward a vertically aligned position with the hooks 87 and 88, respectively, on the work bar 86.

When the proximity switch relay 313 comes into the range of the limit switch N–B for station B, the contacts 303 thereof become opened to de-energize the relay TR to cause an opening of the contacts TR–1, TR–2 and TR–3 to cause an instantaneous application of the brake 128 to halt the movement of the carriage 10 to vertically align the hooks 77, 78 and 87, 88. The foregoing function of the electrical circuitry resulted in a movement of the carriage from station A to station B in the direction indicated by the arrow 327 in FIG. 17.

With control 2 at index station No. 4, contacts C–2–3, C–2–9, C–2–12 and C–2–13 are energized. Since the contacts C–2–12 and C–2–13 have been previously energized, there is no change in the location of the shuttles in stations A and B. Contact C–2–9 (FIG. 12B) will close to energize the relay RR1. This will result in a closing of the contacts RR1–1 and RR1–2 so that the negative side (conductor 199) of the rectifier 197 is grounded through the closed contacts RR1–1 and a positive signal is applied to the conductor P–5. Referring now to FIG. 13, a positive signal received on the line P–5 will energize the relay UP which will result in a closing of the contacts UP–1 to energize the relay U. This will cause the closing of the contacts U–1, U–2 and U–3 to simultaneously energize the lift motor 131 and the brake 152 to move the lift 71 (FIG. 2) from the solid line position to the dotted line position.

Upward movement of the lift 71 will effect an engagement of the hooks 77, 78 and 87, 88 to raise the work bar 86 positioned in the recesses 92–B of the shuttle in station B and articles AR attached thereto above the level of the upper edges of the tanks of the treating stations T–1 through T–10.

When the lift 71 has reached the raised condition, the contact RL–1 will open in the same manner as described above to de-energize the relay U and the positions of the contacts RL–3, RL–4, RL–5 and RL–6 will be changed to those illustrated in FIG. 13. This will result in the application of a positive signal to the conductor P–4. Referring again to FIG. 12D, a positive signal applied to the conductor P–4 will result in energization of the relay RD which will close the contacts RD–1 to send a signal through the now closed contacts C–2–3 and CR2–13 to apply a signal to terminal No. 8 of control 2. This will advance the program for control 2 to index station No. 5.

STAGES B THROUGH D (FIG. 17)

At index station No. 5, contacts C–2–2, C–2–11, C–2–12 and C–2–13 are energized which will result in the application of a signal to terminal No. 8 of control 1 through the now closed contacts C–2–11 and SR1–8 in FIG. 12D. This will cause the program for control 1 to advance to index station No. 2 wherein contact C–1–5 becomes de-energized to de-energize the relay CR2 and contacts C–1–6 and C–1–14 become energized. Simultaneously therewith, a signal is applied to terminal No. 3 of control 2 through the now closed contact C–2–2 to immediately advance the program for control 2 one index station whereupon contact C–2–2 becomes immediately de-energized to stop the program for control 2 at index station No. 6, where contacts C–2–6, C–2–8, C–2–12 and C–2–13 are energized. Since the contacts C–2–12 and C–2–13 have been previously energized, there is no change in the location of the shuttles in station A and B. A closing of the contacts C–1–14 (FIG. 12B) will result in an energization of the relay FR to close the contacts FR–1 and FR–2 to apply a positive signal to the conductor P–6. Referring to FIG. 13, an application of a positive signal to the conductor P–6 will result in energization of the relay FP to cause a forward movement of the carriage in a manner described previously to the proximity of treating station T–1. When the elongated bar 314 is engaged by the limit switch N–1 for station T–1, the switch N–1 (FIG. 12A) is closed to apply a signal through the now closed contacts C–1–6 and SR1–3 to apply a pulse to the terminal No. 8 of control 1 to advance the program to index station No. 3. However, while the traverse motor 96 has been de-energized, the relay TR remains energized due to the "locked in" connection through the normally closed contacts 303 and the closed contacts TR–4. However, when the proximity switch relay 313 comes into the presence of the limit switch N–1 for station T–1, contact 303 will open to de-energize the relay TR to open the contacts TR–1, TR–2 and TR–3 to cause an application of the brake 128 to halt the movement of the carriage 10 at station T–1.

At index station No. 3, contacts C–1–4, C–1–18 and C–1–21 are energized. The normally open contact C–1–18 (FIG. 12B) is closed to energize the relay LR resulting in the closing of the contacts LR–1 and LR–2 to effect a lowering of the lift 71. Simultaneously, the condition of the two sets of contacts C–1–21 (FIG. 12C) are changed so that relay SOA is energized through the normally open contact C–2–12 (which is now closed due to the energization thereof by index station No. 6 of control 2) and closed limit switch LS1. As a result, contacts SOA–1, SOA–2 and SOA–3 are closed to energize the motor 173A in station A so that the shuttle 156 will move leftwardly (FIG. 10) to a position out of alignment with the tracks 34 and 34' until the tab 167A opens limit switch LS1 to de-energize the relay SOA. While the shuttle in station A is in the leftwardmost position, it can be loaded with a work bar having articles AR secured thereto, which articles are to be treated at the treating stations T–1 through T–10. The now empty shuttle in station B remains in the position illustrated in FIG. 10.

The above-described operation has thus far moved the lift 71 in the manner indicated by the arrows 326, 327, 328 and 329 in FIG. 17. A detailed discussion of the step-by-step operation of the lift, to cover all of the programmed functions for a complete cycle of operation, would result in much repetition of material which can be readily recognized by persons skilled in the art. Thus, this summary will skip to the stages E and F where the transition from control 1 to control 3 occurs at index station No. 28 in the program for control 1, after the carriage 10 has moved through stages A through D (FIG. 17). However, and prior to index station No. 28, contact C–1–20 at index station No. 15 in the program for control 1 will close (FIG. 12C) to energize the timer T1. Time T1 can be adjusted between 10 seconds and 5 minutes and will prevent the lift 71 from removing the articles from station T–1 until timer T1 has timed out. Timer T1, therefore, controls the starting point for the carriage 10 so that it will remove articles AR from a treating station and transport them to another treating station at a desired point in time.

Further, contact C–1–19 (FIG. 12C) will periodically close at index stations 17, 22 and 27 to energize a dwell timer TD to prevent an energization of terminal No. 8 on control 1 through the contact TD–1 for a small period of time to effect a delay in the movement of the programmed drum to the next following index station which would energize the carriage 10 for a forward movement. As a result, the carriage 10 is maintained in a position above a treating station for a predetermined amount of time until the timer TD times out to allow the chemicals on the articles AR to drip from the articles back into the tank before they are moved to the next treating station.

At index station No. 28 of control 1, contact C–1–11 is energized which permits an energization of the relay CR3 (FIG. 12A) to cause a change in condition of all contacts having the prefix "CR3." As illustrated in the program for control No. 3 (FIG. 16), contacts C–3–1, C–3–7 and C–3–8 are energized at index station No. 1. This will result in a closing of the contact C–3–8 in FIG. 12D to energize the relay FR, whereby the traverse motor 96 is energized for a forward movement until station T–8 is reached wherein the switch N–8 (FIG. 12D) is closed so that a signal is applied through the now closed contacts C–3–7 and CR3–13 to terminal No. 8 of control 3 to advance the program to index station No. 2. The program for index station No. 2 will cause a lowering of the lift 71 to place a work bar on the recesses 92–8 and, once the lift has been fully lowered, the control circuit will advance the program for control 3 to index station No. 3 wherein the carriage 10 is reversed and moved back to station T–6. When the carriage reaches station T–6, a timer T2 is initiated at index station No. 4, if necessary, to delay the raising of the lift 71 and work bar 86 (if one is present) for a predetermined period to permit the plating action in the tank of station T–6 to be completed. Thus, a very accurate timing to within one second of a plating action is possible without interfering with the length of time that articles remain in the other treating stations. Further, it is possible to vary the time that each article remains in the tank by a simple adjustment of the timer. Upon a timing out of the timer T2, contact T2–1 will apply a signal to terminal No. 8 of control 3 to advance the program to index station No. 5. This will result in a raising of the lift 71 and work bar 86 and after the lift 71 has been fully raised, the program will switch to index station No. 6 wherein the operation is returned to control 1 which is at index station No. 29 and control 3 is immediately switched to index station No. 7 through the now closed contact C–3–2 (FIG. 12D).

STAGE G

At index station No. 29 of control 1, a dwell timer TD is energized as described previously by the closing of the contacts C–1–19 to permit the liquid to drip from the articles AR into the tank at station T–6. Upon a timing out of the timer TD, the contact TD–1 will close to apply a signal to terminal No. 8 of control 1 to advance the program to index station No. 30 which will initiate a forward movement (see arrow 331 in FIG. 17) of the carriage to station T–9. Upon reaching station T–9, the lift will be lowered.

At index station No. 31 of control 1, contact C–1–21 becomes de-energized which will effect a movement of the shuttle in station A (which has now been loaded with a new work bar 86) rightwardly due to the energization of relay SNA and the closing of contacts SNA–2, SNA–3 and SNA–4 (FIG. 10). The shuttle in station B will remain in the "in" or rightward position.

After the lift has reached the lowered position, the program for control 1 will be advanced to index station No. 32 which will initiate an immediate raising of the lift and, upon reaching the raised position, the program at index station No. 33 will effect a movement of the carriage forwardly until it reaches station T–10 and, upon reaching station T–10, the program will be switched to index station 34 to cause a lowering of the lift. After the lift has been completely lowered, the dwell timer TD is initiated by a closing of the contacts C–1–19 to permit the articles AR to rest in the tank at station T–10 for a predetermined amount of time. Upon a timing out of the timer TD, contacts TD–1 will close to move the program to index station No. 36. This will result in a raising of the lift 71 and, upon reaching of the raised position, the dwell timer TD will again be energized by a closing of the contact C–1–19 so that liquid accumulated on the articles AR will drip back into the tank T–10.

STAGE H

Upon closing of the contact TD–1 after a timing out of the timer TD, the program for control 1 will be switched to index station No. 38 whereupon the traverse motor 96 will be energized for a reverse movement and, upon reaching station T–9, the program will be switched to index station No. 39 whereupon the contacts C–1–16 will become energized to cause an energization of the timer FST to close the contacts FST–1 and FST–2 to apply a positive signal to the conductor P–7.

Referring to FIG. 13, a positive signal on the conductor P–7 will result in energization of the relay FSP to cause a closing of the contact FSP–1 to energize the relay FS. This will result in an opening of the contacts FS–1, FS–2 and FS–3 and a corresponding closing of the contacts FS–4, FS–5 and FS–6. This will energize the input terminals 278, 279 and 281 of the traverse motor 96 for a fast traverse back toward station A. However, upon reaching station T–1, a signal is applied to terminal No. 8 of control 1 through the closed contact of switch N–1 and contact C–1–6 to advance the program to index station No. 40 after which the program will be put into a mode of continuous operation until index station No. 1 is reached to stop the movement of the programmed drum. During this time, the control has been switched to control 2 which will control the movement of the carriage for stages J1 and J2, as illustrated in FIG. 17, to deposit a work bar 86 having finished articles secured thereto on the shuttle in station B.

As illustrated in FIG. 17, at the completion of stages J1 and J2, the carriage will repeat stages I–B, I–C and I–D. At the completion of stages I–B, I–C and I–D, control 3 will take over to produce stage K. At the completion of stage K, control 1 will take over to produce a repetition of stage G.

The carriage will then move back to station A to deposit a completed workpiece onto shuttle A and then move forwardly to pick up a new workpiece at shuttle B. The carriage will then repeat the stages I–B, I–C, I–D, K, G and H.

At the completion of stage H, the carriage will move into stages A2, A1, 1–B, 1–C, 1–D and N. However, stage N will be initiated by control 3 and, after its completion, control 3 will switch back to control 1 to provide the necessary movement through stage G to clean the articles AR in the cold and hot water dip tanks T–9 and T–10. The carriage will then move in a manner identical to stage H back to station B wherein stages J1 and J2 are repeated and the finished workpieces are deposited on shuttle B and the carriage moves rearwardly to pick up a new workpiece on shuttle A. The carriage 10 is now in a position to start cycle II, which is identical to the above-described cycle I.

The briefly described operation results in a maximized usage of the treating tanks T–1 through T–10. It is recognized, however, that more treating tanks could be utilized with a modification in the programming of the carriage and its lift.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machine having article-engaging means movable into and out of a plurality of spaced positions located along a path, comprising:
   rail means extending along said path, said rail means including a pair of substantially parallel rails disposed within a substantially horizontal plane;
   carriage means supported by said rail means for movement lengthwise thereof and including an inverted U-shaped frame structure having a substantially horizontal center portion extending transversely between said rails and a pair of downwardly extending end portions fixedly secured to opposite ends of said center portion, said carriage means including roller means disposed in rolling engagement with said rail means;

first drive means drivingly connected to at least some of said roller means for effecting said movement of said carriage means along said rail means, said first drive means including first electric motor means mounted on the center portion of said carriage means for movement therewith along said rail means;

second drive means for effecting said movement of said lift means with respect to said carriage means and including second electric motor means mounted on the center portion of said carriage means for movement therewith; and control means including a source of D.C. potential and first conductor means for transmitting D.C. signals between said control means and said first and second drive means, said control means synchronizing the operation of said first and second motor means for causing said article-engaging means to be moved in a predetermined and repetitive pattern through said positions;

said first conductor means being substantially fixed relative to said rail means and extending longitudinally therealong throughout the path of movement of said carriage means, and said control means also including pick-up means mounted on said carriage means and disposed in movable engagement with said first conductor means for permitting said D.C. signals to be transmitted to said first and second drive means for controlling the operation thereof; and second conductor means substantially fixedly secured relative to said rail means and extending longitudinally therealong throughout the complete path of movement of said carriage means, said second conductor means being connected to a source of A.C. potential, and second pick-up means mounted on said carriage means and disposed in moving engagement with said second conductor means for transmitting A.C. potential to said first and second motor means for permitting energization of same.

2. A machine according to claim 1, wherein said side portions of said carriage each include a substantially vertically extending guide rod, and said lift means including a substantially horizontally extending elongated lift member extending between said side portions of said carriage means, said lift member having guide portions on the opposite ends thereof slideably guided on said guide rods, and the cooperating surfaces of said guide portions on said guide rods having a self-lubricating plastic bearing material disposed therebetween.

3. A machine according to claim 1, wherein said roller means includes support wheel means rotatably supported on said carriage means and disposed in rolling engagement with an upper side of said rail means; and said roller means further including drive wheel means vertically aligned with and disposed below said rail means, said drive wheel means being drivingly interconnected to and driven by said first electric motor means, and resilient means urging said drive wheel means upwardly into engagement with a lower surface of said rail means whereby rotation of said drive wheel means effects movement of said carriage means along said rail means.

4. A machine having article-engaging means movable into and out of a plurality of spaced stations located along a substantially horizontal path, comprising:

rail means extending along and located above said path;

a plurality of receptacles located along said path and below said rails, each receptacle being positioned at one of said stations and being adapted to contain various solutions for plating articles held by said article-engaging means;

carriage means mounted upon said rail means for movement lengthwise thereof;

lift means mounted upon said carriage means for substantially vertical movement with respect thereto, said article-engaging means being adapted for engagement by said lift means;

said lift means including a substantially horizontally elongated lifting bar slideably supported on said carriage means for vertical movement relative thereto, and a lifting device mounted on said carriage means and extending downwardly for engagement with said lifting bar, said lifting device including a vertically extending flexible lifting element;

first drive means drivingly coacting between said carriage means and said rail means for effecting said movement of said carriage means along said rail means, said first drive means including first motor means mounted on said carriage means for movement therewith;

second drive means including second motor means mounted on said cariage means for effecting said vertical movement of said lift means;

control means including a source of direct current potential and conductor means connected to said source and extending longitudinally along said rail means; and receiving means mounted on said carriage means and slideably engaged with said conductor means for receiving direct current signals therefrom, said receiving means being connected to said first and second motor means for controlling the energizing and de-energizing of same, whereby said movements of said carriage means and said lift means are synchronized by said control means and said article-engaging means is moved in a predetermined and repetitive pattern through said stations.

5. A machine according to claim 4, including a pair of loading and unloading stations along said path and shuttle means for moving said article-engaging means into and out of said loading and unloading stations with articles supported thereon; and wherein the operation of said machine is completely automatic from the time that a shuttle means moves an article-engaging means toward a loading and unloading station until the same article-engaging means is moved out of a loading and unloading station by a said shuttle means with the plating operation completed on an article supported thereby.

6. A machine according to claim 4, including plural actuating means located along said rail means at spaced intervals corresponding to the spacing between said stations along said path;

plural sensing means on said carriage means adapted to be energized by said actuating means when said carriage reaches a preselected position with respect to said actuating means said carriage moves along said rail means; and brake means mounted on said carriage means and responsive to a signal transmitted by one of said sensing means for stopping said cariage means precisely at the station associated with said one of said actuating means.

7. In a machine having carriage means supported by rail means for movement lengthwise thereof into and out of a plurality of spaced positions located along said rail means, lift means mounted on said carriage means for movement transversely of said rail means, first drive means adapted to move said carriage means along said rail means, second drive means adapted to move said lift means transversely of said cariage means, the improvement comprising:

a pair of downwardly extending end frames on said carriage means, each end frame having a pair of spaced and downwardly extending elements;

a pair of parallel upright guide rods, one being mounted on each end frame; and elongated horizontal bar means having guide means on the longitudinal ends thereof slideably engaging said guide rods, said guide means being coated with a self-lubricating plastic material, said lift means including a pair of spaced winches mounted on said carriage means and having cable means connected to said bar means.

8. The machine defined in claim 7, wherein said guide rods are coated with a self-lubricating plastic material, and said pair of downwardly extending elements converge downwardly.

References Cited

UNITED STATES PATENTS

| 2,928,401 | 3/1960 | Finston | 204—198 |
| 3,335,839 | 8/1967 | Neumann | 198—19 |
| 3,307,720 | 3/1967 | Davis et al. | 134—76 |

JOHN H. MACK, Primary Examiner

W. I. SOLOMON, Assistant Examiner

U.S. Cl. X.R.

134—76; 198—19